(12) United States Patent
Koenig et al.

(10) Patent No.: US 11,105,760 B2
(45) Date of Patent: Aug. 31, 2021

(54) FLUID SENSOR, METHOD FOR PROVIDING SAME, AND METHOD FOR DETERMINING A CONSTITUENT OF A FLUID

(71) Applicant: Infineon Technologies AG, Neubiberg (DE)

(72) Inventors: Matthias Koenig, Freising (DE); Guenther Ruhl, Regensburg (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 487 days.

(21) Appl. No.: 15/948,665

(22) Filed: Apr. 9, 2018

(65) Prior Publication Data
US 2018/0292340 A1    Oct. 11, 2018

(30) Foreign Application Priority Data

Apr. 10, 2017   (DE) .......................... 102017206124.3

(51) Int. Cl.
*G01N 27/12*    (2006.01)
(52) U.S. Cl.
CPC .................. *G01N 27/124* (2013.01)
(58) Field of Classification Search
CPC ........... G01N 33/0009; G01N 33/0027; G01N 33/004; G01N 27/4077; G01N 33/0036; G01N 27/12
USPC ....................................... 73/31.05
See application file for complete search history.

(56) References Cited

U.S. PATENT DOCUMENTS

| | | | | |
|---|---|---|---|---|
| 2010/0043530 | A1* | 2/2010 | Elian | G01L 19/141 73/31.06 |
| 2013/0223023 | A1* | 8/2013 | Dehe | B81B 7/0029 361/752 |
| 2014/0254850 | A1* | 9/2014 | Elian | H04R 17/025 381/355 |
| 2015/0002145 | A1* | 1/2015 | Ausserlechner | G01R 33/07 324/251 |
| 2015/0078042 | A1* | 3/2015 | Standing | H02M 7/219 363/37 |
| 2015/0185180 | A1* | 7/2015 | Ruhl | G01N 27/127 73/31.06 |
| 2016/0190446 | A1* | 6/2016 | Schulze | H01L 21/02587 438/478 |
| 2017/0082591 | A1* | 3/2017 | Mori | G01N 33/18 |
| 2017/0205250 | A1* | 7/2017 | Aichriedler | G01R 21/08 |

FOREIGN PATENT DOCUMENTS

| | | |
|---|---|---|
| DE | 4423289 C1 | 11/1995 |
| DE | 69316862 T2 | 9/1998 |
| DE | 19818474 A1 | 11/1999 |
| DE | 102004028701 B3 | 11/2005 |
| DE | 102014002077 A1 | 8/2015 |

* cited by examiner

*Primary Examiner* — Peter J Macchiarolo
*Assistant Examiner* — Mohammed E Keramet-Amircolai
(74) *Attorney, Agent, or Firm* — Slater Matsil, LLP

(57) ABSTRACT

A fluid sensor comprises a sensor material configured to come into contact at a surface region of same with a fluid and to obtain a first temporal change of a resistance value of the sensor material on the basis of the contact in a first sensor configuration and to obtain a second temporal change of the resistance value of the sensor material on the basis of the contact in a second sensor configuration. The fluid sensor comprises an output element configured to provide a sensor signal on the basis of the first and second temporal change of the resistance value.

30 Claims, 14 Drawing Sheets

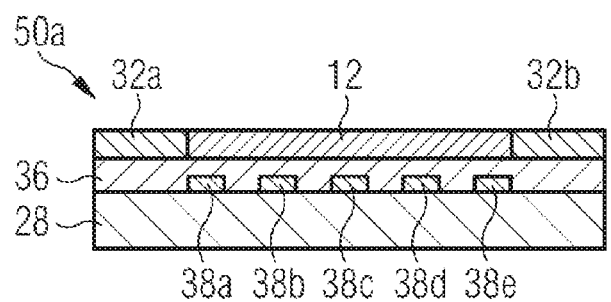
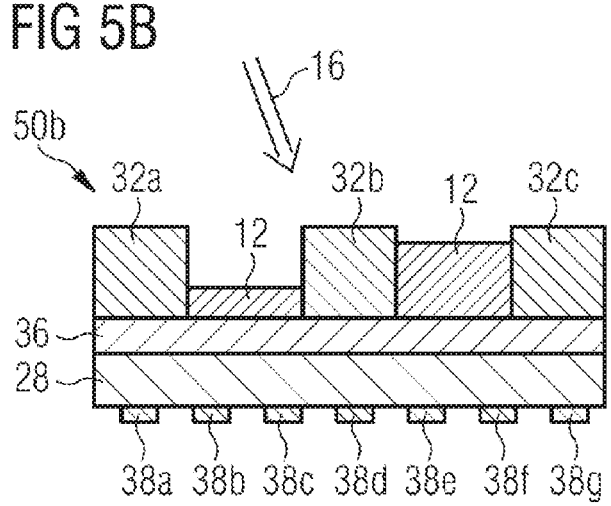

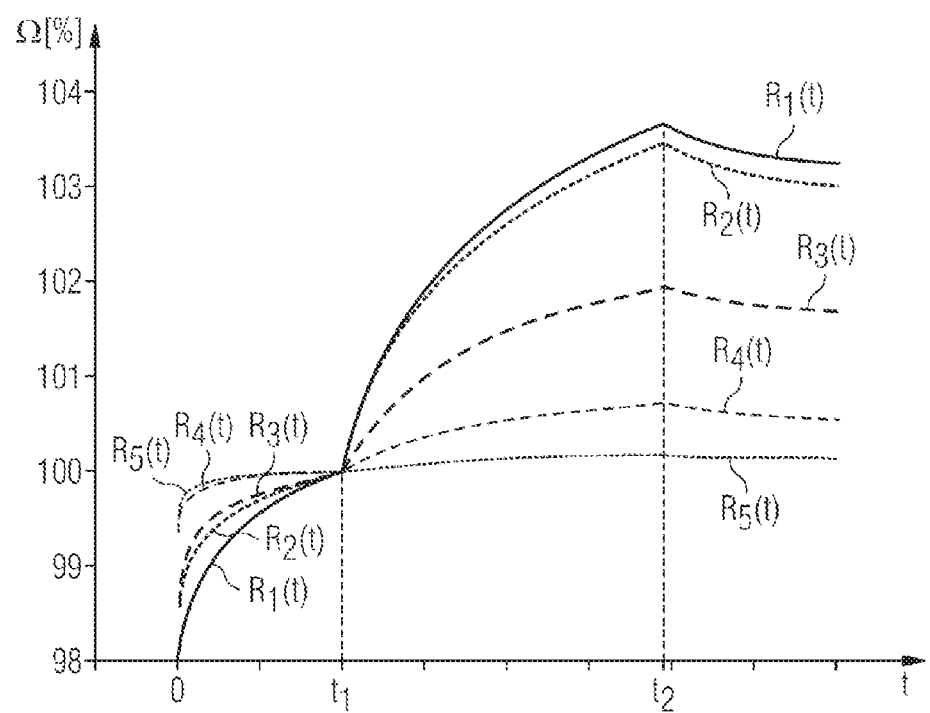

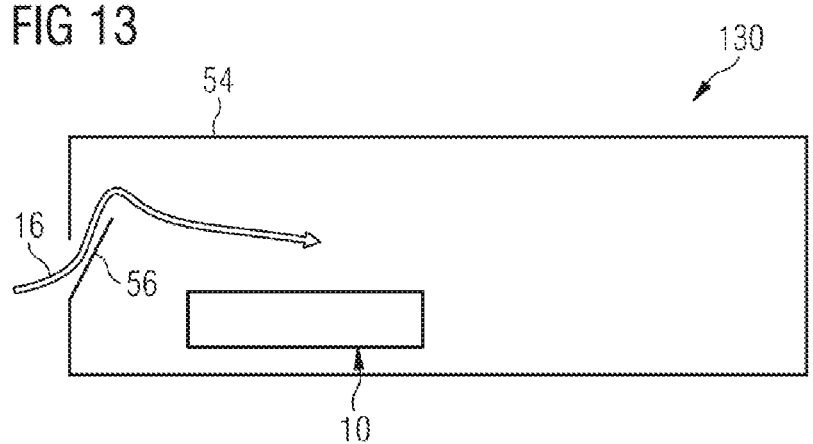
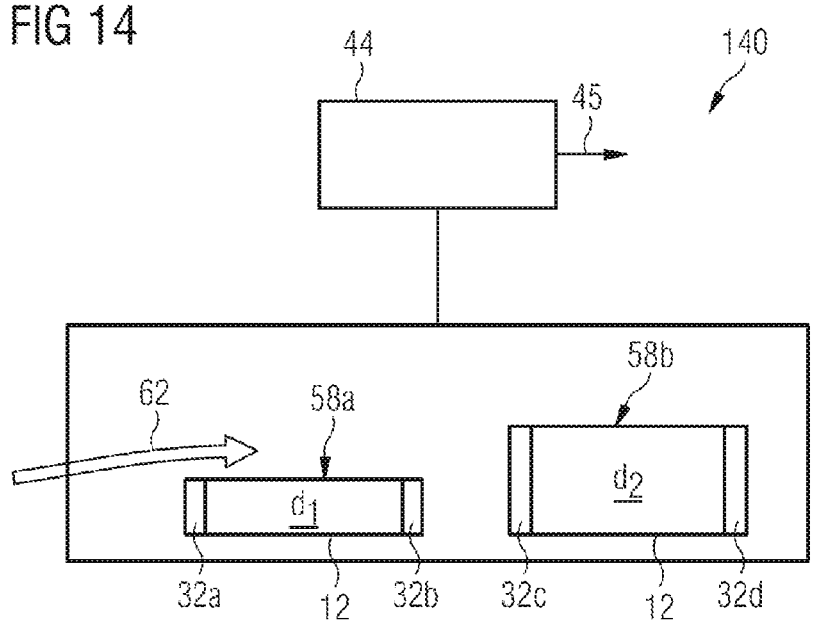

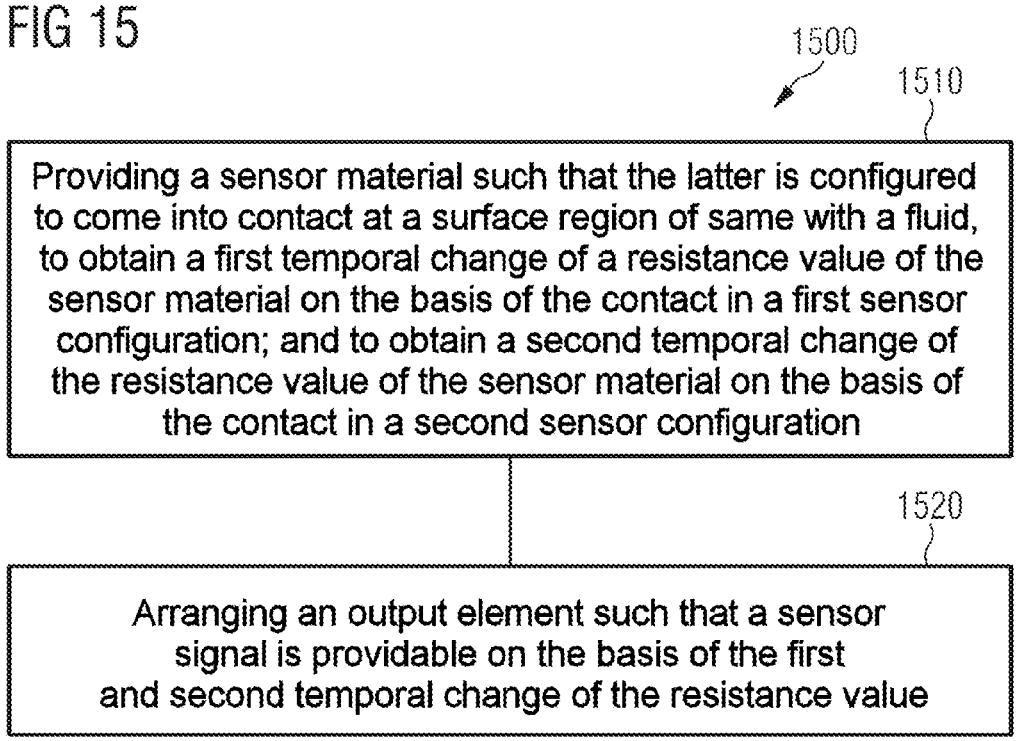
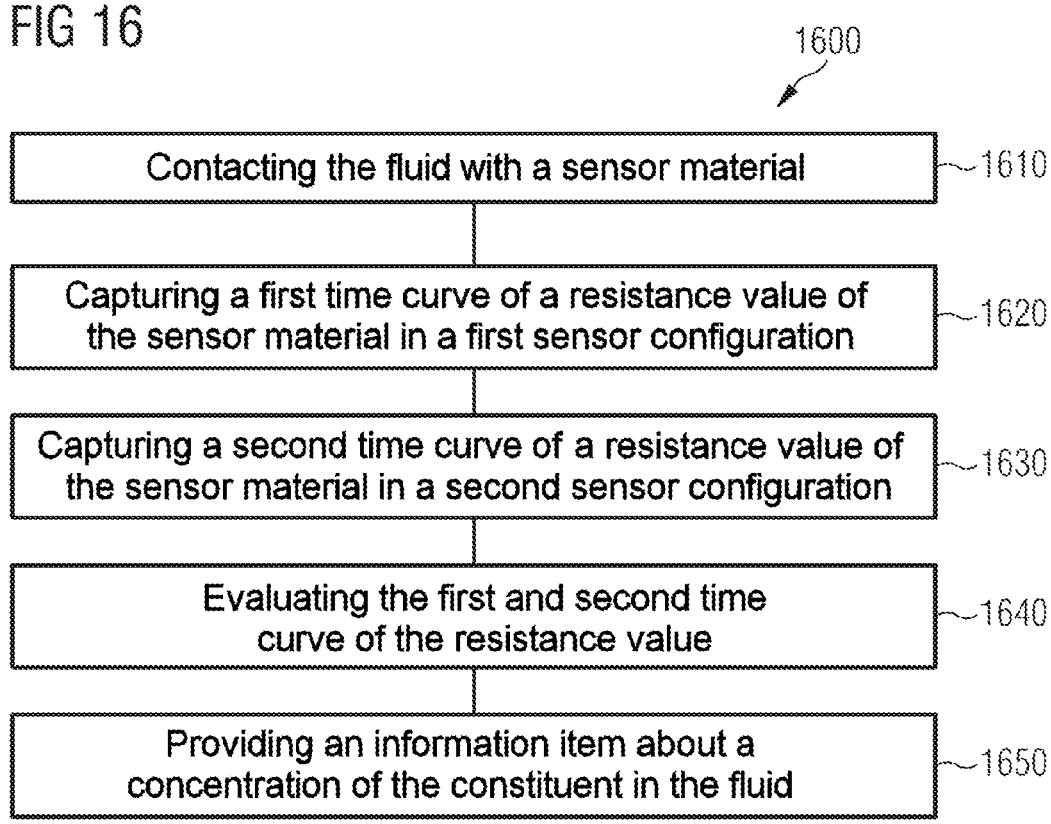

FLUID SENSOR, METHOD FOR PROVIDING SAME, AND METHOD FOR DETERMINING A CONSTITUENT OF A FLUID

This application claims the benefit of German Application No. 10 2017 206 124.3, filed on Apr. 10, 2017, which application is hereby incorporated herein by reference in its entirety.

TECHNICAL FIELD

The present disclosure relates to fluid sensors, for example gas sensors, to a method for providing a fluid sensor, and to a method for determining a constituent of a fluid. Further, the present disclosure relates to a diffusion-based multi-gas sensor.

BACKGROUND

Fluid sensors facilitate the determination of a concentration or presence of a constituent in a fluid. To this end, a property such as a capacitance or a resistance in a sensor material can be changed accordingly upon contact of same with the fluid, and so it is possible to deduce a property of the fluid by capturing the changed physical property.

A fluid sensor facilitating an exact characterization of the fluid would be desirable.

SUMMARY

Exemplary embodiments create a fluid sensor having a sensor material configured to come into contact at a surface region of same with a fluid and to obtain a first temporal change of a resistance value of the sensor material on the basis of the contact in a first sensor configuration. The sensor material is configured to obtain a second temporal change of the resistance value of the sensor material on the basis of the contact in a second sensor configuration. The fluid sensor comprises an output element configured to provide a sensor signal on the basis of the first and second temporal change of the resistance value. Obtaining two temporal changes of the resistance value facilitates an exact characterization of the fluid.

A further exemplary embodiment creates a gas sensor comprising a first sensor layer with a first layer thickness, said first sensor layer being arranged between a first electrode pair and being embodied to provide, on the basis of a gas material, a first temporal change of a resistance value of the first sensor layer between the first electrode pair on the basis of a contact with the gas material. The gas sensor comprises a second sensor layer with a second layer thickness, said second sensor layer being arranged between a second electrode pair and being embodied to provide, on the basis of the gas material, a second temporal change of the resistance value of the second sensor layer between the second electrode pair. The gas sensor comprises an evaluation device embodied to provide an evaluation signal on the basis of the first temporal change and the second temporal change, said evaluation signal indicating an information item in respect of a constituent of the gas material.

A further exemplary embodiment creates a method for providing a fluid sensor. The method comprises providing a sensor material such that the latter is configured to come into contact at a surface region of same with a fluid. The provision is effectuated in such a way that a first temporal change of a resistance value of the sensor material is obtained on the basis of contact with the fluid in a first sensor configuration and that a second temporal change of the resistance value of the sensor material is obtained on the basis of the contact in a second sensor configuration. The method comprises arranging an output element such that a sensor signal is providable on the basis of the first and second temporal change of the resistance value.

According to an exemplary embodiment, a method for determining a constituent of a fluid comprises contacting the fluid with a sensor material. The method comprises capturing a first time curve of a resistance value of the sensor material in a first sensor configuration. The method further comprises capturing a second time curve of the resistance value of the sensor material in a second sensor configuration. The method comprises evaluating the first and second time curve of the resistance value and comprises providing an information item about a concentration of the constituent in the fluid.

BRIEF DESCRIPTION OF THE DRAWINGS

Exemplary embodiments are explained in more detail below, with reference being made to the attached drawings. In the drawings:

FIG. 5a shows a schematic side sectional view of a fluid sensor comprising temperature-changing elements between material layers of a layer stack, according to an exemplary embodiment;

FIG. 5b shows a schematic side sectional view of a fluid sensor having temperature-changing elements at an outer side of the layer stack, according to an exemplary embodiment;

FIG. 10 shows schematic curves of changes in resistance for a fluid sensor according to an exemplary embodiment, said fluid sensor having five sensor configurations;

FIG. 13 shows a schematic side sectional view of a fluid sensor arranged in a housing, according to an exemplary embodiment;

FIG. 14 shows a schematic block diagram of a gas sensor according to an exemplary embodiment;

FIG. 15 shows a schematic flowchart of a method for providing a fluid sensor according to an exemplary embodiment;

FIG. 16 shows a schematic flowchart of a method for determining a constituent of a fluid according to an exemplary embodiment.

DETAILED DESCRIPTION OF ILLUSTRATIVE EMBODIMENTS

Before exemplary embodiments are explained in more detail below on the basis of the drawings, reference is made to the fact that identical and functionally equivalent elements, objects and/or structures or elements, objects and/or structures with the same effect are provided with the same reference signs in the various figures, and so the description of these elements presented in various exemplary embodiments is interchangeable among the exemplary embodiments and can be applied to other exemplary embodiments.

The exemplary embodiments below relate to a fluid sensor. Fluids may be present in a liquid and/or gaseous phase. Even though the following embodiments relate to microelectromechanical gas sensors that are producible within the scope of semiconductor manufacturing, the exemplary embodiments are not restricted thereto.

Figure 1A:
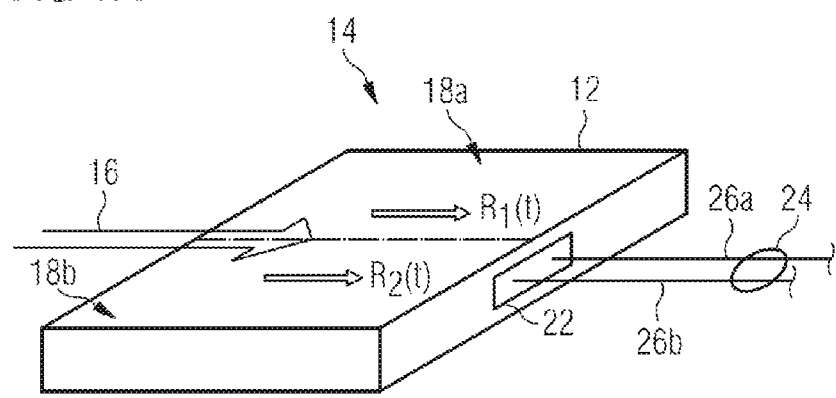
FIG. 1a shows a schematic perspective view of a fluid sensor according to an exemplary embodiment.

FIG. 1a shows a schematic perspective view of a fluid sensor 10 according to an exemplary embodiment. The fluid sensor 10 comprises a sensor material 12 configured to come into contact at a surface region 14 with a fluid 16. The sensor material 12 has a first sensor configuration and a second sensor configuration. The first and second sensor configuration may relate to configurations of the sensor material 12 that differ from one another, for instance in different sensor regions 18a and 18b. The different configuration in the sensor regions can relate to diffusion or absorption properties of the sensor material that differ from one another in the sensor regions 18a and 18b. This can be obtained by virtue of different materials being arranged in the sensor regions 18a and 18b, said materials accordingly having different properties. As an alternative thereto, it is possible to arrange the same material in the sensor regions 18a and 18b and configure the former differently, for example in view of a layer thickness or in view of doping. Alternatively, or additionally, the sensor configurations that differ from one another may also be obtained by different properties of the sensor material 12 following one another in time such that the arrangement of one sensor region 18a or 18b may be sufficient for having two or more sensor configurations, for instance following one another in time. By way of example, this may be obtained by way of temperatures of the sensor material 12 that differ from one another, and so there is a different influence on the sensor material 12 by the fluid 16 on the basis of the different temperatures.

The sensor material 12 is configured to obtain or have a first temporal change $R_1(t)$ of a resistance value of the sensor material 12 on the basis of the contact with the fluid 16 in the first sensor configuration. By way of example, this can be effectuated in the sensor region 18a. In the second sensor configuration, for instance in the sensor region 18b, the sensor material 12 is configured to obtain or provide a second temporal change $R_2(t)$ of the resistance value of the sensor material 12 on the basis of the contact with the fluid 16. The sensor material 12 may be configured to provide in the first sensor configuration a first diffusion constant of the sensor material for a constituent of the fluid, i.e. specific molecules, and to provide in the second sensor configuration a second diffusion constant in order to obtain the temporal changes $R_1(t)$ and $R_2(t)$, meaning that the temporal changes $R_1(t)$ and $R_2(t)$ may provide a clue about the effect of a constituent of the fluid 16 in the sensor material 12 of the respective configuration. The different diffusion constants can provide or facilitate the different temporal changes of the resistance value.

The fluid sensor 12 comprises an output element 22 configured to provide a sensor signal 24 on the basis of the temporal changes $R_1(t)$ and $R_2(t)$ of the resistance value of the sensor material 12. The sensor signal 24 can comprise a first component 26a and a second component 26b. The first component 26a can have an information item about the temporal change $R_1(t)$ while the component 26b can have an information item about the temporal change $R_2(t)$. By way of example, this can be the resistance value $R_1(t)$ and $R_2(t)$ or a variable derived therefrom. By way of example, a derived variable can be an analog or digital voltage signal that, in comparison with a further voltage signal, specifies the resistance value had by the sensor material 12. Alternatively, it can be an analog or digital current signal. The components 26a and/or 26b can be equal or proportional to the temporal changes $R_1(t)$ and $R_2(t)$ of the resistance value, meaning that the sensor signal 24 can directly specify the resistance value of the respective sensor configuration. According to an exemplary embodiment, the sensor signal 24 is an unprocessed variable that can be provided directly by the sensor material 12 and that can be received and evaluated by an evaluation device.

Figure 1B:
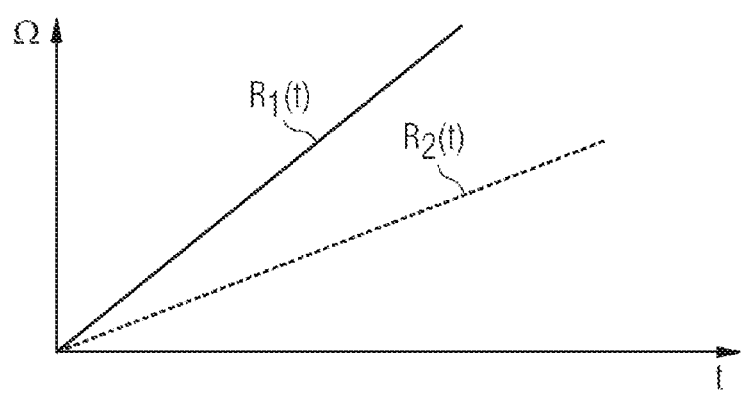
FIG. 1b shows a schematic illustration of two temporal changes in resistance of a resistance value of a sensor material of the fluid sensor from FIG. 1a over time and according to an exemplary embodiment.

The temporal changes $R_1(t)$ and $R_2(t)$ of the resistance value of the sensor material 12 can be effectuated, for example, by mutually different diffusion of constituents of the fluid in the sensor material 12, and so a mutually different diffusion in the sensor configurations leads to a different temporal change in the resistance value, as illustrated in conjunction with FIG. 1b.

FIG. 1b shows a schematic illustration of two temporal changes $R_1(t)$ and $R_2(t)$ of a resistance value $\Omega$ of the sensor material 12 over time t. Although the temporal changes $R_1(t)$ and $R_2(t)$ are illustrated as linear functions, the temporal changes $R_1(t)$ and/or $R_2(t)$ may also be nonlinear functions.

The curves of $R_1(t)$ and $R_2(t)$ can be influenced by a concentration of the respective constituent in the fluid 16, meaning that the concentration with which a respective constituent is present can be derivable on the basis of the sensor signal 24, in particular a time curve of same.

Even though the time curves $R_1(t)$ and $R_2(t)$ are illustrated as continuous functions, this may also relate to discontinuous functions. The functional curve of the time curves $R_1(t)$ and $R_2(t)$ can be influenced by the sensor material 12 and/or by constituents of the fluid 16. Even though the fluid sensor 10 is described in such a way that it can have two sensor configurations, and consequently two curves $R_1(t)$ and $R_2(t)$, fluid sensors according to the exemplary embodiments described herein may also have a greater number of sensor configurations and resistance curves, for instance at least 3, at least 5, at least 10 or more.

The temporal changes or curves of $R_1(t)$ and $R_2(t)$ can differ from one another on the basis of the different sensor configurations of the sensor material 12, meaning that the fluid 16 brings about a different change in the resistances of the sensor material in the different sensor configurations. This different change in resistance and/or an evaluation of the difference facilitates undertaking an exact and detailed evaluation of the fluid 16 using the sensor material 12 or the fluid sensor 10 since a high level of information is obtained. In particular, the curves $R_1(t)$ and $R_2(t)$ may be influenced by a concentration of the respective constituent in the fluid 16, meaning that the concentration with which a respective constituent is present may be derivable on the basis of the sensor signal 24, in particular a time curve of same.

Moreover, it is likewise possible that different constituents in the fluid 16 have a different effect in the respective sensor configurations, meaning that on the basis of the mutually different time curves $R_1(t)$ and $R_2(t)$ can be based on a first and a second constituent of the fluid 16. Using the information items in the sensor signal 24, it is consequently possible to obtain information about at least a first and a second constituent of the fluid 16.

The sensor material 12 may comprise any material suitable to this end, for instance aluminum oxide ($Al_2O_3$), chromium oxide ($Cr_2O_3$), iron oxide ($Fe_2O_3$), nickel oxide ($Ni_2O_3$), zirconium oxide ($ZrO_2$) and/or silicon oxide (SiO). According to exemplary embodiments, the sensor material has a turbostratic carbon material or turbostratic graphite. In exemplary embodiments, an electrically conductive carbon material is provided, with graphite and/or multilayer graphene being possible configurations here.

A layer of turbostratic graphite may comprise pure turbostratic graphite or graphene or may comprise at least 95 mol-% turbostratic graphite. Turbostratic graphite can have a ratio of an $sp^2$ hybridization in relation to an $sp^3$ hybridization of more than 95%. The component of $sp^2$ hybridization can be determined on the basis of the component of $sp^2$ hybridized carbon ($Csp^2$) which is arranged from an overall amount of $sp^2$ and $sp^3$ hybridized carbon ($Csp^2+Csp^3$). Turbostratic graphite can have hydrogen. Turbostratic carbon material can be robust in relation to aggressive media and fluids and facilitate reliable permanent operation, i.e. exhibit low levels of aging effects. The turbostratic graphite can have a nanocrystallite property, meaning a crystallite dimension in a range of 1-100 nm of the graphite. Expressed differently, the sensor material may be configured to come into contact at a surface region of same with the fluid 16 and to obtain a first temporal change of the resistance value of the sensor material on the basis of the contact with a constituent of the fluid in the first sensor configuration and to obtain a second temporal change of the resistance value of the sensor material on the basis of the contact with the constituent of the fluid in a second sensor configuration.

Figure 2A:
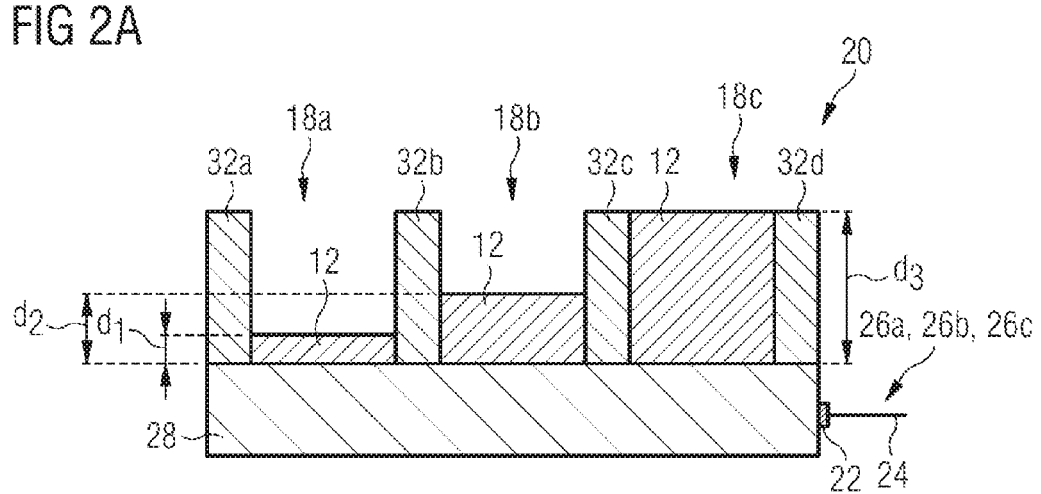
FIG. 2a shows a schematic side sectional view of a fluid sensor having three sensor configurations, according to an exemplary embodiment.

FIG. 2a shows a schematic side sectional view of a fluid sensor 20 according to an exemplary embodiment. The fluid sensor 20 comprises a substrate 28, for example a semiconductor material comprising silicon or the like. The sensor material 12 is arranged at the substrate 28. The fluid sensor 20 can have three sensor configurations of the sensor material 12 that differ from one another, said three different sensor configurations being assigned to three surface regions 18a to 18c that differ from one another. In the surface region 18a, the sensor material 12 can be arranged with a first layer thickness $d_1$. In the surface region 18b, the sensor material 12 can be arranged with a layer thickness $d_2$ that differs therefrom. In the surface region 18c, the sensor material 12 can be arranged with a layer thickness $d_3$ that differs from $d_1$ and $d_2$. A layer thickness can relate to a distance, obtained by the sensor material 12, between two opposite main sides of the sensor material 12, with one of the two main sides being arranged facing the substrate 28 or connected to the latter and the opposing main side facing away from the substrate 28.

The sensor material 12 in the surface regions 18a to 18c can be arranged in each case between an electrode pair comprising electrodes 32a and 32b, 32b and 32c, and 32c and 32d, respectively, and so a resistance value of the sensor material 12 in the interposed surface regions 18a, 18b and 18c is capturable or determinable by means of the electrode pair 32a; 32b, 32b; 32c, and 32c; 32d. By way of example, the resistance of the sensor material 12 can be captured by way of a voltage drop of a voltage applied to the electrode pair.

The thickness $d_1$ can have a comparatively lowest value, for instance in a range of less than 1 nm to 10 nm, for instance 5 nm. The thickness $d_2$ can have a comparatively higher value, for instance 10 nm. The thickness $d_3$ can have a comparatively greatest value, for instance 20 nm. Here, neither the specified thickness values nor the described sequence should be construed as limiting. Layer thicknesses may have any value that is at least 0.1 nm and at most 5 µm, for example. As an alternative thereto, use can be made of any layer thickness of at least 0.2 nm and 1 µm or of at least 0.3 nm and at most 100 nm, for instance 0.34 nm, which can correspond to the thickness of a carbon atom layer. The layer thicknesses may differ by at least 10%, at least 50% or at least 100% in order to obtain temporal changes of the resistance values of the sensor material 12 that clearly differ from one another. By way of example, $d_1<d_2<d_3$ with $d_3=x \cdot d_2=y \cdot d$, with x, y>1, for example 1.5, 2 or 3.1, may apply. This means that the sensor regions 18a, 18b and/or 18c may be arranged at the substrate 28 with a lateral distance from one another. Alternatively, or additionally, the sensor material 12 can have a first layer thickness $d_1$ in the first sensor region 18a and a second layer thickness $d_2$ in the second sensor region 18b.

Even though the layer thicknesses $d_1$, $d_2$, and $d_3$ are illustrated in such a way that they continuously increase or continuously decrease along an arrangement direction on the substrate, a sequence of the layer thicknesses can be arbitrary. Even though an arrangement of the layers is shown in a one-dimensional distribution, a two-dimensional distribution along two directions on the substrate or by forming a layer stack is also possible and/or a three-dimensional distribution as well, for instance by arranging a two-dimensional distribution and using stacks of sensor layers over one another.

Figure 2B:
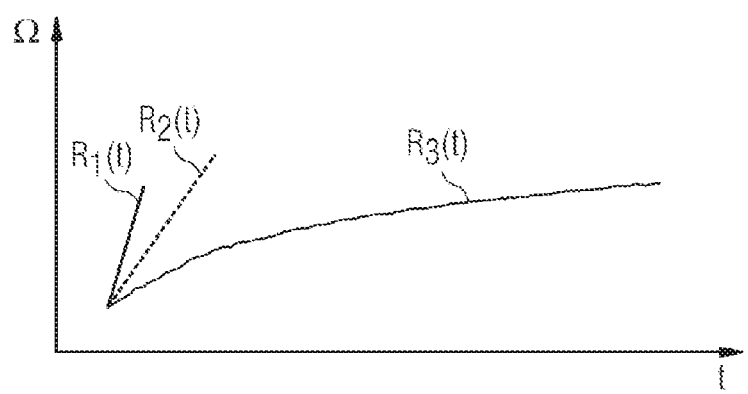
FIG. 2b shows a schematic diagram of three temporal changes in resistance of the three sensor configurations from FIG. 2a according to an exemplary embodiment.

FIG. 2b shows a schematic diagram of three temporal changes $R_1(t)$, $R_2(t)$, and $R_3(t)$, which can be obtained upon contact of the sensor material 12 in the surface regions 18a to 18c with constituents of the fluid. The temporal change $R_1(t)$ can be assigned to the layer thickness $d_1$, the temporal change $R_1(t)$ can be assigned to the layer thickness $d_2$ and the temporal change $R_3(t)$ can be assigned to the layer thickness $d_3$. Expressed differently, FIG. 2a shows a fluid sensor for measuring different gases without using different sensor materials and functionalizations. The fluid sensor 20 is based on a diffusion measurement of fluids, for instance gases, using the effect that, in principle, larger molecules of the fluid have a lower diffusion constant than smaller molecules.

The sensor signal 24 may have information items in respect of the time curves 26a, 26b, and 26c in the surface regions 18a to 18c. This means that the first and second sensor configuration can be part of a multiplicity of sensor configurations, wherein the fluid sensor may be embodied to obtain a corresponding multiplicity of temporal changes of the resistance value of the sensor material 12 on the basis of the contact with the fluid 16. The output element 22 can be embodied to provide the sensor signal 24 on the basis of the multiplicity of temporal changes 26a to 26c of the resistance value.

Expressed differently, FIG. 2a shows a set of sensor layers with different thicknesses and FIG. 2b shows assigned responses upon impingement by a fluid.

Figure 3:
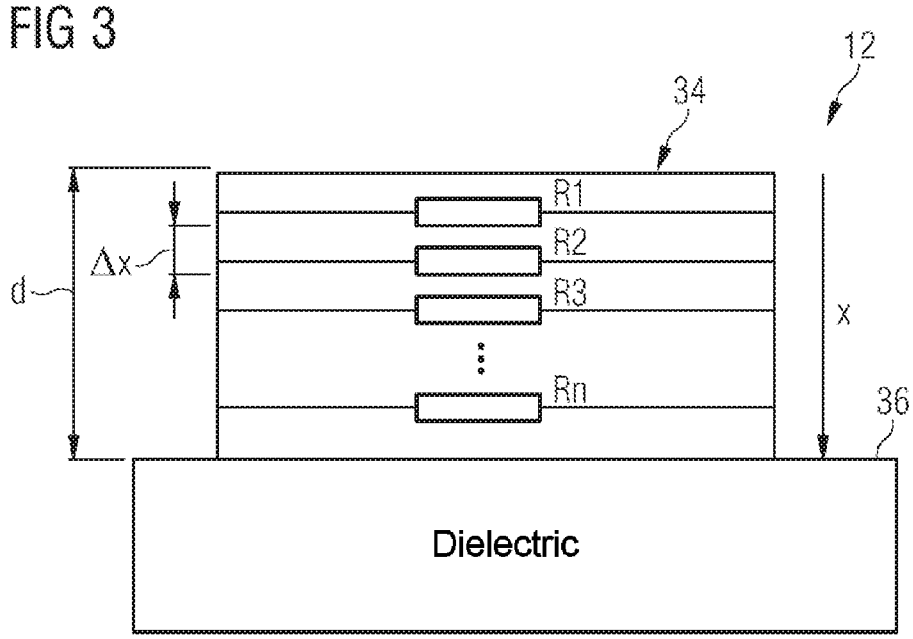
FIG. 3 shows a schematic equivalent circuit diagram of a circuit representing a fluid sensor according to exemplary embodiments.

FIG. 3 shows a schematic equivalent circuit diagram of a circuit representing a fluid sensor according to exemplary embodiments. A layer of the sensor material 12 comprising a thickness d, for instance thickness $d_1$, $d_2$ or $d_3$, can produce a distance x between a dielectric 36, for instance the substrate 28, and a surface 34 of the sensor material 12, for instance a main side of the sensor material 12 facing away from the dielectric 36. Alternatively, the dielectric 36 can be arranged between the substrate 28 and the electrodes in order to prevent a short circuit via a substrate material. By way of example, the dielectric can comprise silicon oxide ($S_iO_2$) or any other dielectric material.

The distance x can be decomposable into arbitrarily small individual distances $\Delta x$. Each of these individual distances $\Delta x$ can be represented by or modeled as a resistor $R_i$ with i=1, . . . , n, where n is the number of arbitrary individual distances $\Delta x$. The individual resistors $R_i$ can be considered to be connected to one another in parallel. If a layer $\Delta x$ of the sensor material 12 takes up or absorbs a molecule, i.e. a constituent of the fluid, this may change the resistor $R_i$ of this layer, i.e. increase or decrease the resistance of the latter. The fluid may diffuse slowly, i.e. at a certain speed, through the entire layer, for example along the direction x, and so the resistance can be changed in an increasing number of individual layers, which may be capturable in the overall resistance. As a result of the absorption, there is a respective change in the individual resistor $R_i$, as a result of which there is an increasing change in the overall resistance of the parallel circuit, meaning that the overall resistance of the parallel circuit supplies a clue about the extent to which the individual resistors $R_i$ have changed their resistance value. The resistor $R_n$ may therefore change its resistance at a later point or more slowly than the resistor $R_1$. This behavior is reproduced in the sensor signal 24 and facilitates the determination of a diffusion constant of the fluid or of a constituent thereof, which can be represented in the curves of $R_i(t)$.

FIGS. 4a to 4d schematically show exemplary configurations of fluid sensors 40a, 40b, 40c, and 40d according to exemplary embodiments.

Figure 4A:
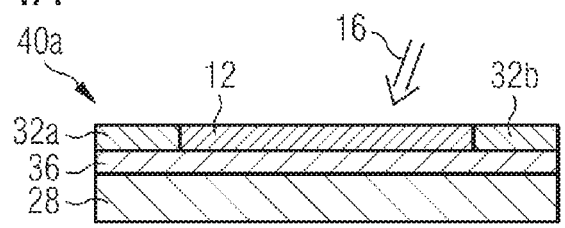
FIGS. 4a to 4d show schematic illustrations of different configurations of fluid sensors according to exemplary embodiments.

FIG. 4a shows a schematic side sectional view of the fluid sensor 40a, in which electrodes 32a and 32b are arranged laterally parallel to a surface of the substrate 28 and wherein the sensor material 12 is arranged between the electrodes 32a and 32b. The fluid sensor 40a may have different sensor configurations of the sensor material 12 on the basis of temperatures that differ from one another, for example, and so the time curves of the resistance that differ from one another between the electrodes 32a and 32b are capturable.

Figure 4B:
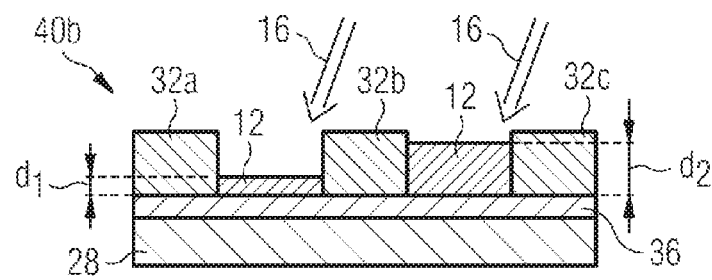

FIG. 4b shows a schematic side sectional view of a fluid sensor 40b, in which the lateral configuration according to FIG. 4a has been extended to the effect of the fluid sensor 40b being able to have the sensor material 12 with two layer thicknesses $d_1$ and $d_2$ that differ from one another, wherein the individual layers may be arranged laterally between electrodes 32a and 32b and 32b and 32c, respectively. The first and second sensor configuration can be obtained on the basis of the different layer thicknesses $d_1$ and $d_2$, with this also being combinable, without restrictions, with temperatures that differ from one another.

Figure 4C:
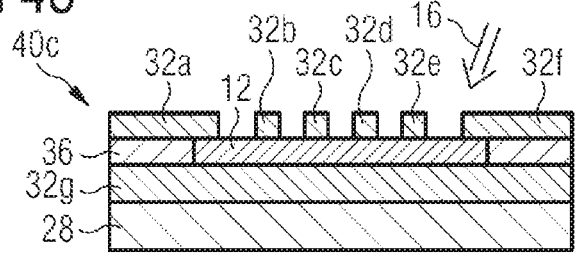

FIG. 4c shows a schematic side sectional view of a fluid sensor 40c, in which the sensor material 12 is arranged vertically between an electrode 32g arranged at the substrate 28 and electrodes 32a, 32b, 32c, 32d, 32e, and 32f. An electric potential in relation to the electrode 32g can be applied, independently of one another, to the electrodes 32a to 32f; however, the latter may also be part of a common electrode structure with a common electric potential, and so the fluid 16 is able to pass through the sensor material 12 through distances between the electrodes 32a to 32f and able to come into contact with the sensor material 12. As described in conjunction with FIG. 4a, the first and the second sensor configuration and possibly further sensor configurations may be obtained, for example, by changing temperatures of the sensor material 12. Alternatively, or additionally, it is possible to apply different potentials between different partial electrodes and the electrode 32g in order to produce different electric fields that produce the different sensor configurations. By way of example, a first potential in relation to the electrode 32g can be applied to the electrode 32b and a second potential, differing therefrom, can be applied to the electrode 32d.

Figure 4D:
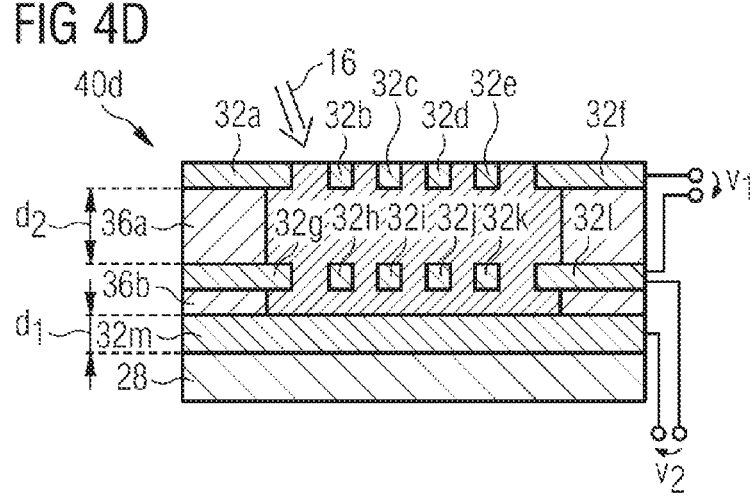

FIG. 4d shows a schematic side sectional view of a fluid sensor 40d, in which the configuration according to FIG. 4c is extended along a layer thickness direction, for example a vertical alignment, such that the sensor material 12 is arranged with the layer thickness $d_2$ between electrodes 32a to 32f on the one hand and an electrode 32l and with the layer thickness $d_1$ between the electrodes 32g to 32l and the electrode 32m. The electrodes 32a to 32f can be used as a common electrode. The electrodes 32g to 32l can be used as a common electrode. However, the electrodes 32a to 32f and 32g to 32l can be arranged in such a way that the fluid 16 can pass through distances between the electrodes in order to be absorbed by the sensor material 12. This means that the sensor regions of the layer thickness $d_1$ and the layer thickness $d_2$ can form a sensor region stack.

A voltage can be applicable between a respective pair of electrodes in order to capture the time curve of the change in resistance. This can be effectuated by a time varying voltage in order to obtain, in a time varying fashion, the first and second sensor configuration in the sensor material 12. This is illustrated in an exemplary manner for the electrode pair 32f; 32l, to which a voltage $U_1$ is applicable in order to set a sensor configuration in the sensor material with the layer thickness $d_2$. A voltage $U_2$ can be applicable to an electrode pair 32l; 32m in order to set a different sensor configuration in the sensor material 12 with the thickness $d_1$. The voltages can be the same over the entire layer, or can be different in time or different laterally in order to provide a plurality of surface regions for one layer.

Different voltages can be applicable in different lateral regions of the sensor material 12 in order to obtain different sensor configurations at the same time but in laterally different regions of the sensor material 12. This means the fluid sensor may comprise a plurality of electrodes embodied to apply a first voltage to the sensor material in the first sensor configuration and to apply a second voltage to the sensor material in the second sensor configuration. Alternatively, or additionally, the first voltage can be applicable in a first surface region or sensor material region and the second voltage can be applicable in a second surface region or sensor material region. By way of example, a first voltage can be produced for the fluid sensor 40d between the electrode 32h and the electrode 32m and a second voltage can be produced between the electrode 32k and the electrode 32m. Other arbitrary combinations of voltage are likewise conceivable.

Expressed differently, FIGS. 4a to 4d show possible exemplary embodiments, in which sensor layers are stacked on top of one another and resistance measurement electrodes are situated between the layers. A stacked sensor may have a small sensor area and may comprise two or more sensor layers and a corresponding number plus 1 of gas permeable electrodes, for instance comprising holes.

FIG. 5a shows a schematic side sectional view of a fluid sensor 50a that comprises temperature-changing elements 38a to 38e that are individually actuatable according to an exemplary embodiment, wherein at least two of the temperature-changing elements 38a to 38e form a common temperature-changing element according to another exemplary embodiment. The temperature-changing elements 38a to 38e can be embodied to change a temperature of the sensor material 12 either individually or together, i.e. to heat and/or cool the sensor material 12. By way of example, at least one of the temperature-changing elements 38a to 38e can be a heating element configured to heat the sensor material 12. To this end, provision can be made of an ohmic heating element, for example, which produces heat on the basis of ohmic losses. Alternatively, or additionally, provision can be made of a Peltier element in order to produce heat. At least one of the temperature-changing elements 38a to 38e can be embodied to reduce the temperature of the sensor element 12. To this end, provision can be made of a Peltier element, for example. It is likewise possible for one of the temperature-changing elements 38a to 38e to be a Peltier element configured to act as a heating element and as a cooling element at different times.

The arrangement of temperature-changing elements 38a, 38b, 38c, 38d, and/or 38e can facilitate, in comparison with the fluid sensor 40a, the production of heat directly in the fluid sensor 50a instead of supplying it from an external source. By way of example, the temperature-changing elements 38a to 38e can be arranged within a stack comprising the substrate 28, possibly the dielectric 36, and the sensor material 12. This means that the at least one temperature-changing element can be arranged between the substrate material 28 and the sensor material 12. This allows a temperature change produced by the temperature-changing elements 38a to 38e to act directly in the material of the fluid sensor 50a and parasitic emissions into surroundings of the fluid sensor 50a to be low. By way of example, a temperature change from 10° C. to 100° C. may lead to an increase in the diffusion constant of hydrogen in iron by a factor of 75. Thus, for example, already 10° C., for example, suffices for a significant change. Here, it should be noted that the temperature dependence of the diffusion constant can follow an exponential law with the energy barrier E which, analogous to the Arrhenius equation, can be presented as $$D = D_0 \cdot \exp\left(-\frac{E}{R \cdot T}\right)$$

where R is the universal gas constant and D is the obtained diffusion constant in relation to an initial diffusion constant $D_o$. By way of example, an evaluation device according to exemplary embodiments is embodied to bring about a temperature change of at least 3° C., at least 5° C., at least 10° C. or at least 15° C. for a change in the sensor configuration.

FIG. 5b shows a schematic side sectional view of a fluid sensor 50b which extends the fluid sensor 40b by arranging temperature-changing elements 38a to 38g on a side of the substrate 28 facing away from the sensor material 12. Alternatively, the temperature-changing elements 38a to 38g may also be arranged at any other location on the outer side of the stack comprising the substrate 28, the dielectric 36, and the sensor material 12 and also the electrodes 32a to 32c, wherein the arrangement on a lower side of the stack, i.e. on a side facing away from a side for contacting the fluid 16, may allow a large-area induction of a temperature change to be effectuated uniformly over the fluid sensor 50b. In comparison with the fluid sensor 50a, an arrangement as shown in the fluid sensor 50b may be simpler.

The temperature-changing elements 38a to 38e, and 38a to 38g, in the fluid sensors 50a and 50b should merely be understood to be exemplary. Other numbers are likewise possible, for example no temperature-changing element, at least one temperature-changing element, at least two temperature-changing elements or more. If at least one temperature-changing element is arranged, the latter may be embodied to provide cooling and/or heating of the sensor material 12. If two or more temperature-changing elements are provided, these may have functions that differ from one another, for instance at least one for heating the sensor material 12 and at least one for cooling said sensor material.

On the basis of the temperature change, the first sensor configuration of the sensor material 12 may be obtained at a first temperature and another sensor configuration of the sensor material 12 may be obtained at a different temperature.

Referring to the temperature-changing elements 38 in FIGS. 5a and 5b, possible configuration thereof is explained according to an exemplary embodiment. At least one of the temperature-changing elements 38a to 38e, or 38a to 38g, can be embodied to increase the temperature of the sensor material 12; i.e., this is a heating element. The heating element may be embodied to provide heating of the sensor material 12, said heating being configured to reduce a portion of fluid material arranged in the sensor material 12. As a result of the diffusion of at least one constituent of the fluid 16 into the sensor material 12, for instance during a measurement, a saturation effect may occur in the sensor material 12, as is illustrated in FIGS. 9b and 9d, for example. The saturation effect may be so comprehensive that a change of concentrations of constituents in the fluid has an effect only with a great time delay or possibly has no effect in the sensor material 12. By heating the sensor material 12, it is possible to carry out a type of reset, meaning that the sensor material 12 is put into a state in which the constituents of the fluid 16 are absorbed again such that the time curve of the change in resistance can be determined again. To this end, the temperature-changing element can be embodied to carry out heating of at least 50° C., at least 6° C. or at least 8° C., wherein, depending on the material, even temperatures of up to 400° C. are possible.

Expressed differently, an exemplary embodiment of a fluid sensor has an integrated heater configured to improve regeneration of the sensor at elevated temperatures that facilitate a shorter response time of the fluid sensor. Further, the changeable behavior of the diffusion constants of different gases at different temperatures can be used to identify these gases separately from one another, for instance by virtue of an evaluation device undertaking an analysis of the principal constituents or the principal constituent of the fluid for evaluating the sensor signal.

Figure 6:
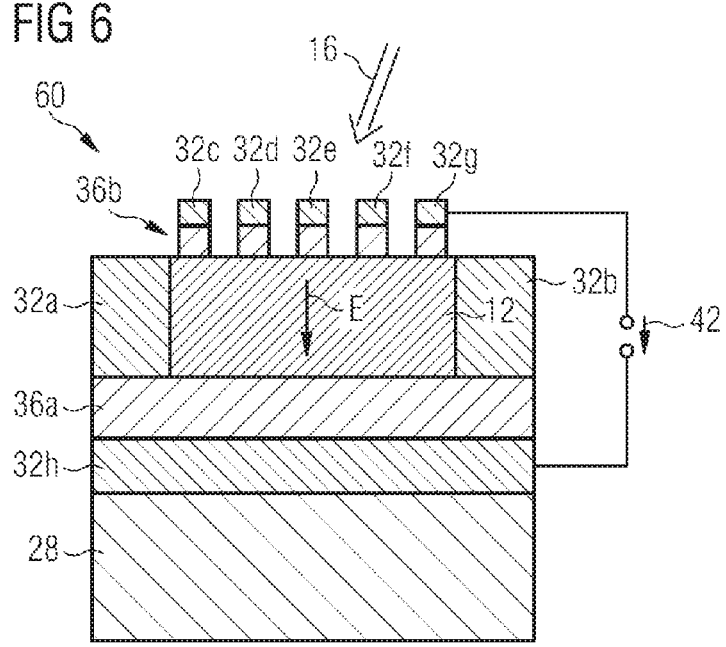
FIG. 6 shows a schematic side sectional view of a fluid sensor according to an exemplary embodiment, in which sensor configurations are modifiable by an electric field.

FIG. 6 shows a schematic side sectional view of a fluid sensor 60 according to an exemplary embodiment. The fluid sensor 60 comprises a layer stack comprising the substrate 28 and a first dielectric layer 36a, for example having silicon oxide, wherein an electrode 32h may be arranged between the layers 28 and 36a. The layer stack further comprises the sensor material 12, in respect of which electrodes 32a and 32b are arranged in a lateral configuration, for example comprising gold, copper, silver or any other conductive material, for instance a doped semiconductor material.

The electrodes 32a and 32b can be embodied to capture the temporal change of the resistance value of the sensor material 12. Further electrodes 32c-g, which may be actuatable individually or in a combined fashion, and 32h can be spaced apart from the sensor material 12 by means of dielectric layers 36a and 36b and can be embodied to produce an electric field E on the basis of a voltage 42 between the electrodes 32c-g and 32h, the sensor material 12 being exposed to said electric field in order to obtain at least the first and second sensor configuration. By way of example, the absence of the electric field E may provide one of the groups of the first and second sensor configurations and the presence of the electric field E may provide the other of the group of the first and second sensor configurations. Alternatively, or additionally, a different sensor configuration can be obtained in the sensor material 12 on the basis of differently strong electric fields E. The voltage 42 can be a DC voltage with constant or variable amplitude. Alternatively, it can be an AC voltage such that the electric field E is an alternating current field.

Expressed differently, FIG. 6 shows a technical implementation in which the sensor layer is arranged between two insulated electrodes (combination of the electrodes 32c-g and electrode 32h) in order to apply an electric field E. In a constant electric field E, the constituent of the fluid, i.e. the test molecules, can be accelerated on the basis of the dipole moments thereof, representing a further information component in respect of the evaluation of the fluid. It is likewise possible to use a varying alternating current field (AC field), for instance for impedance spectroscopy. Some molecules of the fluid will be able to follow this frequency, which may be influenced by the mass and/or dipole moment of said molecules. This information item can be used to separate different molecule masses/molecule types in the test fluid or test gas. Applying a constant or varying electric field may lead to a molecule being accelerated by the constant electric field if said molecule has a dipole moment. In the case of a varying electric AC field, smaller molecules can follow the frequency better than larger molecules; this is usable for impedance spectroscopy. This effect, too, can be traced in the resistance curves.

Figure 7:
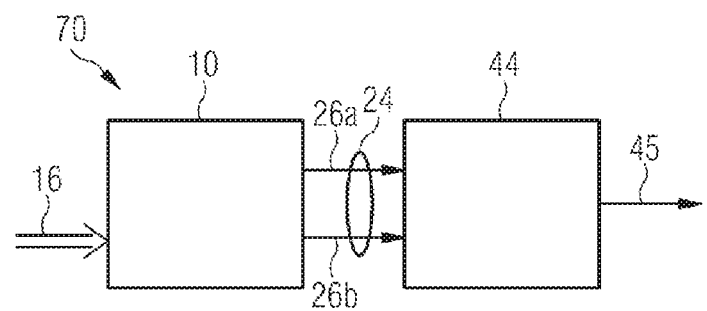
FIG. 7 shows a schematic block diagram of a fluid sensor according to an exemplary embodiment, which has an evaluation device.

FIG. 7 shows a schematic block diagram of a fluid sensor 70 according to an exemplary embodiment. The fluid sensor 70 comprises the fluid sensor 10, for example, and further comprises an evaluation device 44 coupled to the fluid sensor 10 and embodied to receive or read the sensor signal 24 and to provide an evaluation signal 46 on the basis of the first and second temporal change 26a and 26b of the resistance value. The evaluation signal 46 comprises an information item about a constituent of the fluid 16. By way of example, the information item about the constituent of the fluid can be an information item in respect of a concentration of the constituent in the fluid 16.

Even though the fluid sensor 70 is described in such a way that it comprises the fluid sensor 10, it is alternatively or additionally possible for one or more other fluid sensors 10, 20, 40a-d, 50a-b and/or 60 to be arranged.

Figure 8A:
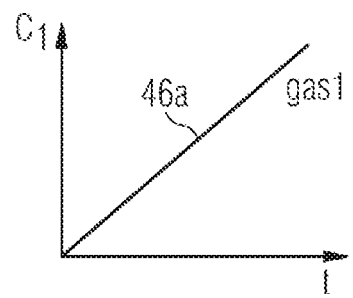
FIGS. 8a to 8e show schematic illustrations of relationships between changes in concentration of a fluid constituent and changes in resistance according to exemplary embodiments.

FIGS. 8a to 8d show schematic illustrations of relationships between changes in concentration of a constituent $C_1$ and $C_2$, respectively, using the example of a gaseous fluid. The concentration $C_1$ relates to a curve 46a of a concentration of a first gas-like molecule, while a curve 46b relates to the concentration $C_2$ of a second, different gas-like molecule, for example in the fluid of air. Consequently, the curve 46a illustrated in FIG. 8a shows a continuously increasing concentration $C_1$ over time t.

Figure 8C:
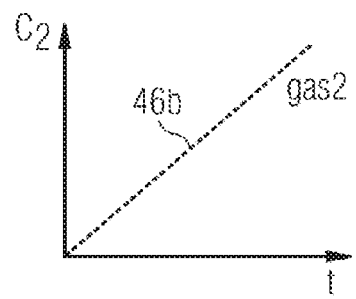
Figure 8B:
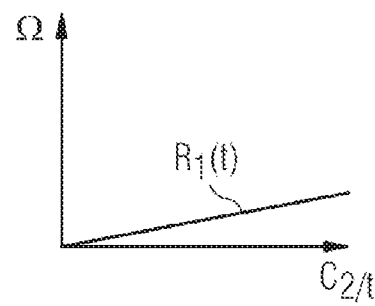

FIG. 8b shows a change in the resistance $R_1(t)$ belonging to FIG. 8a. The continuous increase in the concentration in the curve 46a can lead to a continuous change, for instance an increase or decrease, in the resistance since an increasing number of molecules are bound in the sensor material.

By way of the curve 46b, FIG. 8c shows an increase in the concentration $C_2$ of the second gas constituent that is comparable to the curve 46a, said curve, in comparison with the curve of $R_1(t)$, however being able to lead to a faster increase in the resistance in the curve of $R_2(t)$. The curves of $R_1(t)$ and $R_2(t)$ consequently show a respective change of the resistance in the surface sensor in the assigned sensor configuration.

Figure 8D:
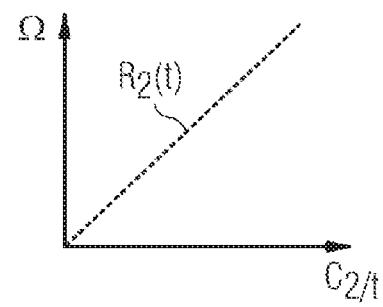
Figure 8E:
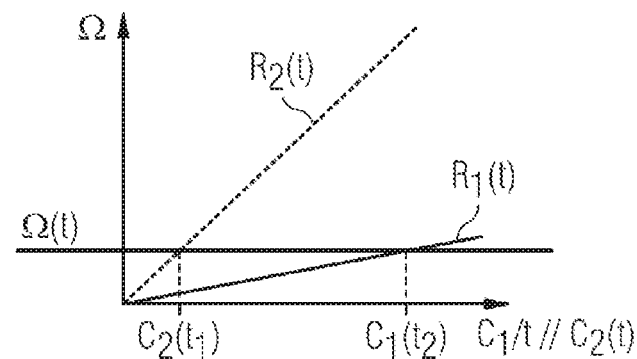

FIG. 8e shows a schematic graph which illustrates the curves of $R_1(t)$ and of $R_2(t)$ of FIGS. 8b and 8d in a common diagram. The consideration of a measurement value Q(t) captured at one time in a sensor layer having a single sensor configuration may relate to a corresponding point $C_1(t_2)$ in the curve $R_1(t)$ and may relate to a corresponding point $C_2(t_1)$ in the curve $R_2(t)$ and may consequently be ambiguous on its own.

Expressed differently, it may be difficult or impossible to distinguish between the two gases since different concentrations of the various gases may lead to the same resistance value.

Figure 9A:
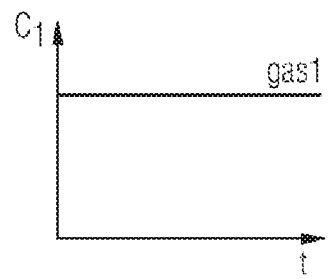
FIGS. 9a to 9d show schematic diagrams for illustrating a functionality of an evaluation device according to exemplary embodiments.
Figure 9C:
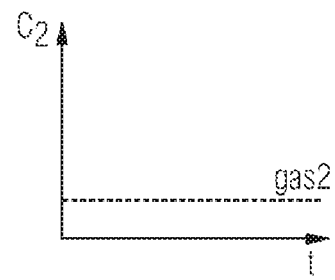
Figure 9B:
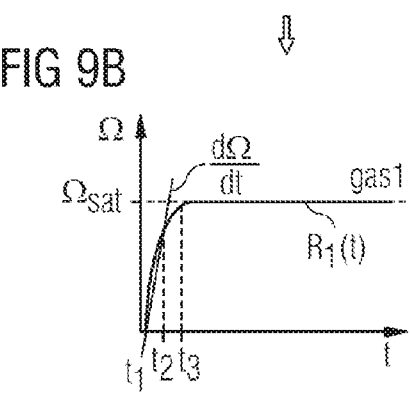
Figure 9D:
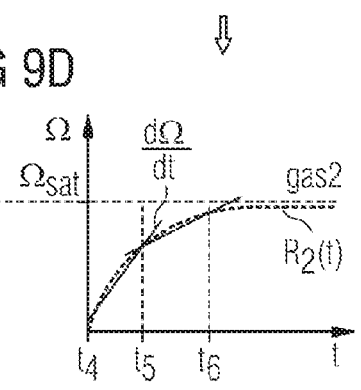

FIGS. 9a to 9d show schematic diagrams for illustrating a functionality of an evaluation device according to exemplary embodiments, for example of the evaluation device 44, and may provide data in the case of different layer thicknesses of the sensor layer. FIG. 9a shows a constant concentration $C_1$ of the first gas constituent over time t.

FIG. 9b shows a schematic diagram of the resistance of the sensor layer 12. As a result of the diffusion and/or absorption of parts of the gas (fluid) into the sensor layer 12, it is possible to obtain an increase of the electric resistance $\Omega$ up to a saturated resistance $\Omega_{sat}$. The evaluation device is embodied, for example, to determine the temporal change of the resistance value $\Omega$ for a plurality of measurement intervals between the times $t_1$ and $t_2$ and/or $t_2$ and $t_3$. Building thereon, a gradient $d\Omega/dt$ can be obtained or formed by the evaluation device 44, such a gradient being comparatively large in the case of FIG. 9b, i.e. there is a quick change in the resistance $\Omega$.

FIG. 9c shows a schematic illustration of a constant concentration $C_2$ of a second constituent of the fluid (gas 2) over time $t_1$ which may be lower in comparison with the concentration $C_1$.

FIG. 9d schematically shows a change in resistance analogous to FIG. 9c. On the basis of the lower concentration $C_2$ in comparison with the concentration $C_1$ and/or on the basis of a diffusion speed that differs from the first gas constituent (gas 1), the saturation $\Omega_{sat}$ of the resistance $\Omega$ is obtained later than illustrated in FIG. 9b, and so gradients between times $t_4$, $t_5$, and $t_6$ are lower than in FIG. 9b. This means that although the same saturation resistance $\Omega_{sat}$ is obtained in the exemplary embodiment on the basis of the lower concentration and/or on the basis of the material properties that differ from one another, there is a difference in the gradients. By way of example, the evaluation device is embodied to determine the changes in resistance for a plurality of measurement intervals, between the times $t_4$, $t_5$, and $t_6$, for instance, in order to ascertain an information item in respect of the constituent of the fluid, meaning the concentration and/or the type of a molecule in the fluid. Even though the concentrations $C_1$ and $C_2$ are illustrated for different gas 1 and gas 2 gas constituents, different results may also be obtained for different concentrations of the same gas constituent and/or for different concentrations of the same gas constituents.

Gradients between two measurement time points and/or curves or changes of gradients may be assigned to a certain sensor material for a respective material or molecule of a fluid, and so the material or molecule of a fluid is identifiable on the basis of the gradient or the gradient curve if the properties of the sensor material are known. This may be effectuated in such a way that the material or molecule is uniquely identifiable since a different material, different concentration or different composition of materials in the fluid would lead to a different change in the resistance and consequently to different gradients. Reference curves can be created during a calibration and may be stored in a memory that is accessible for the evaluation device. The evaluation device can be embodied to identify one of the saved curves on the basis of different measurement points during the actual operation, the current measurements corresponding to or at least having a small deviation from said curve, and, on the basis thereof, to provide information items in relation to which material or molecule is present in the fluid or which materials or molecules are present in the fluid. By way of example, the evaluation device may be embodied to approximate a fitting function which uses the measurement values as nodes and contains parameters that are comparable to the reference values such that the evaluation device can compare the parameters. The gradient may be characteristic for a fluid type or gas type, or a constituent thereof, and so the constituent can be identified by identifying the gradient and/or by an assignment to a comparison function.

Expressed differently, the gas illustrated in FIGS. 9a and 9b may have a larger diffusion constant than the gas illustrated in FIGS. 9c and 9d. A thickness of the sensor layers may be constant, and so this may relate to a sensor that reacts to different gases.

FIG. 10 shows schematic curves $R_1(t)$ to $R_5(t)$ for a fluid sensor according to an exemplary embodiment that has five sensor configurations. The different curves have differences in the gradients. By way of example, the sensor material comprises turbostratic graphene, wherein the curve $R_1(t)$ may be assigned to a layer thickness of 5 nm, the curve $R_2(t)$ may describe a repetition measurement of the curve $R_1(t)$ with a further component with the same thickness of 5 nm, the curve $R_3(t)$ may describe a layer thickness of 10 nm, the curve $R_4(t)$ may describe a layer thickness of 20 nm and the curve $R_5(t)$ may describe a layer thickness of 40 nm. These values only represent exemplary properties and may also be correlated individually or in combination with electric field strengths that differ from one another, frequencies of the electric field that differ from one another, voltages and/or temperatures, as described in conjunction with fluid sensors explained above.

A first fluid is guided to the sensor at a time t=0. By way of example, this may be a certain number of standard cubic centimeters sccm of pure and synthetic air. Without limiting effect, use can be made for example of a flow rate of 300 sccm. The different constituents of air lead to a change in resistance $R_1(t)$ to $R_5(t)$ with different speeds in the different sensor configurations, up to a first saturated resistance value of normalized 100%. By way of example, this is reached at a time $t_1$. This can be identified by virtue of a coincidence of the curves $R_1(t)$ to $R_5(t)$ being present at a time $t_1$. Subsequently, the composition of the fluid is changed, for example, for instance by virtue of a certain component of the synthesized air being substituted with ammonia. As a non-limiting example, the use of 285 sccm synthesized air together with 15 sccm ammonia should be described here, said ammonia being diluted in the synthesized air.

This leads to a differently strong change, for example an increase in the resistance values in the curves $R_1(t)$ to $R_5(t)$, wherein the resistance value in the curve $R_1(t)$ may increase by 3.5%, for example, and it may only increase by 0.1 to 0.2% in the curve $R_5(t)$.

The evaluation device may be embodied to evaluate the different temporal changes, for example by forming gradients, of the curves $R_1(t)$ to $R_5(t)$ in the different sensor configurations. The evaluation device may be connected to a data memory that has reference values for different fluid constituents, fluid concentrations and measurement intervals. The evaluation device may be embodied to determine a functional relationship on the basis of different measurement points at different times and/or during different time intervals, for instance by forming a fitting function which approximates the respective time curve $R_1(t)$ to $R_5(t)$. The evaluation device can be embodied to compare the formed fitting functions for one or more of the curves $R_1(t)$ to $R_5(t)$ to a group of comparison functions, with the comparison functions being associated with a group of fluid constituents and/or fluid concentrations. On the basis of a comparison result of the formed fitting functions with the comparison functions, the evaluation device is able to provide the evaluation signal 45 such that the latter indicates which fluid constituent is present and/or the concentration with which the fluid constituent is present.

FIG. 10 further shows another change in the fluid at a time $t_2$, for instance a renewed supply of 300 sccm of synthetic air. This may lead once again to changes in the resistance values that differ from one another, this likewise being detectable by the fluid sensor or the evaluation device.

The fluid sensor may have a plurality of sensor configurations. The evaluation device may be embodied to provide the evaluation signal 45 in such a way that it has an information item in respect of a plurality of constituents of the fluid corresponding to a plurality of sensor configurations. By way of example, a fluid sensor described in FIG. 10 and having five sensor configurations may be embodied to evaluate five fluid constituents. This may be facilitated by virtue of a sensor configuration being able to provide different results for a) the same gas in different concentrations, for b) different gases with the same concentration, and for c) different gases in different concentrations, which may be evaluable individually or in combination by the evaluation device, for example by forming the evaluation or comparison functions.

The evaluation device may further be embodied to monitor the fluid in respect of one or more constituents. This may be effectuated over an observation time period, for instance between the times 0 and $t_1$ in FIG. 10. The evaluation device can be embodied to output the evaluation signal 45 if concentration of the constituent in the fluid does not change over the observation time period in such a way that it has an information item about the unchanged concentration. By way of example, if the fluid is left unchanged at the time $t_1$ in FIG. 10, the curves $R_1(t)$ to $R_5(t)$ could also be superposed at times after $t_1$. This can be interpreted by the evaluation device to the effect that the previously captured fluid composition or the concentration of the fluid constituent has remained unchanged. This can be regarded to the effect that the considered fluid constituent has a value unequal to 0 and has led to a change in the resistance, but does not continue to change. Alternatively, or additionally, it is also possible to provide an alarm signal if a concentration of a certain material is reached or exceeded.

The change in the fluid composition at times $t_1$ and/or $t_2$ may trigger a new, changeable saturation in the sensor material according to the embodiments of FIG. 9b and/or FIG. 9d.

In other words, it is likewise possible to measure a mixture of two or more gases and, to this end, use the different saturation gradients in different sensor configurations, for instance sensor layer thicknesses. A thick sensor layer will predominantly measure gases or fluids with a high diffusion constant, with thin sensor layers measuring both, i.e. high and low diffusion constants. Consequently, the sensor response can be based on the sensor layer thickness, for example during use of an nc C:H sensor layer, meaning a nanocrystalline turbostratic carbon material.

Figure 11A:
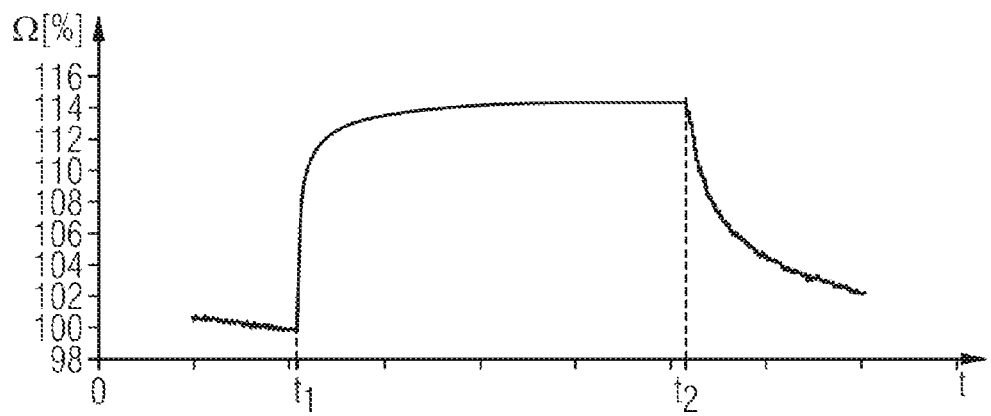
FIG. 11a shows a schematic illustration of a change in resistance according to an exemplary embodiment, corresponding to contact of the sensor material with water.
Figure 11B:
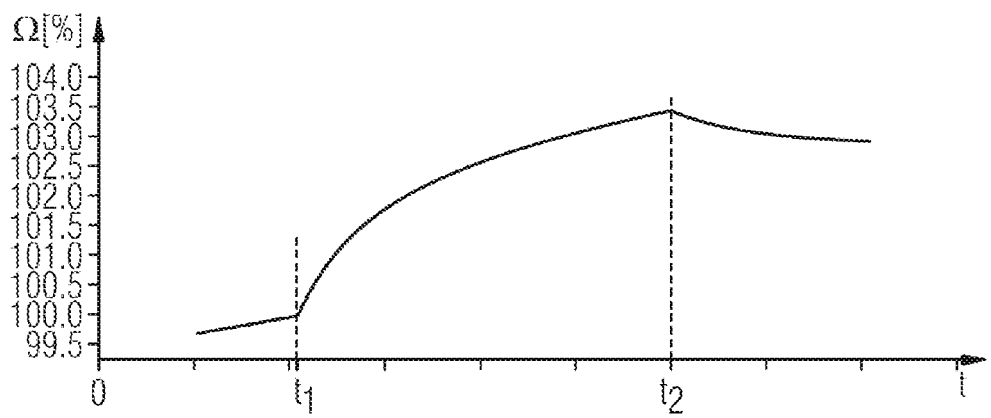
FIG. 11b shows a schematic illustration of a change in resistance according to an exemplary embodiment, corresponding to contact of the sensor material with $NH_3$.

By analyzing the resistance gradient over time, it is possible to distinguish between the two gases. FIGS. 11a and 11b are used to describe the function of the evaluation device on the basis of a further embodiment. By way of example, use can be made of a sensor configuration comprising a 5 nm thick turbostratic graphite layer in order to be associated with a water molecule ($H_2O$) which quickly diffuses into the sensor layer, as illustrated in FIG. 11a.

By way of example, FIG. 11b shows contacting of the same layer with the fluid $NH_3$, contacting occurring at time $t_1$ in each case. The fluid is removed again at time $t_2$, which can be identified by the decreasing curve of the resistance curve. It is further possible to identify that the saturation illustrated in FIG. 11a is effectuated substantially faster than the saturation illustrated in FIG. 11b. This means that $H_2O$ can saturate the sensor layer substantially faster.

Figure 12A:
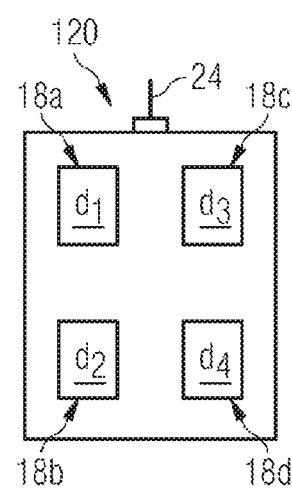
FIG. 12a shows a schematic plan view of a fluid sensor according to an exemplary embodiment, said fluid sensor being configured to have four sensor configurations on the basis of four layer thicknesses in four surface regions.

FIG. 12a shows a schematic plan view of a fluid sensor 120 configured to have four sensor configurations on the basis of four layer thicknesses $d_1$ to $d_4$ in four surface regions 18a to 18d.

Figure 12B:
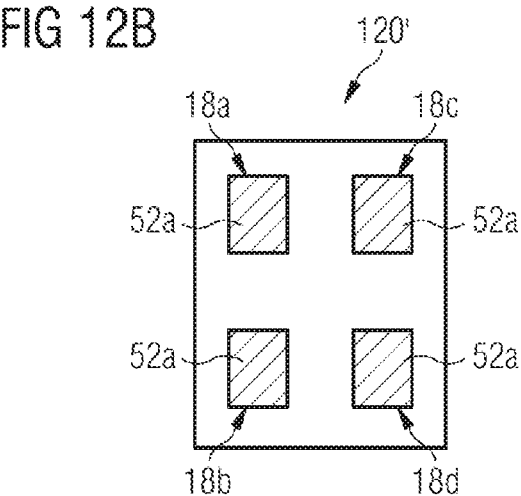
FIG. 12b shows a schematic plan view of the fluid sensor from FIG. 12a, said fluid sensor having turbostratic graphite as a sensor material that is doped with a first doping material, according to an exemplary embodiment.

FIG. 12b shows a schematic plan view of the fluid sensor 120' from FIG. 12a, said fluid sensor having the turbostratic graphene that is doped with a first doping material 52a, for example metal particles, which facilitate the adaptation of the sensitivity and hence the selectivity of the sensor configurations with respect to certain fluids. The functionalization material 52a can be arranged using various methods, either subsequently or during the layer production, for instance by implantation during growing or by sputtering. By way of example, the metal material can comprise nickel.

Figure 12C:
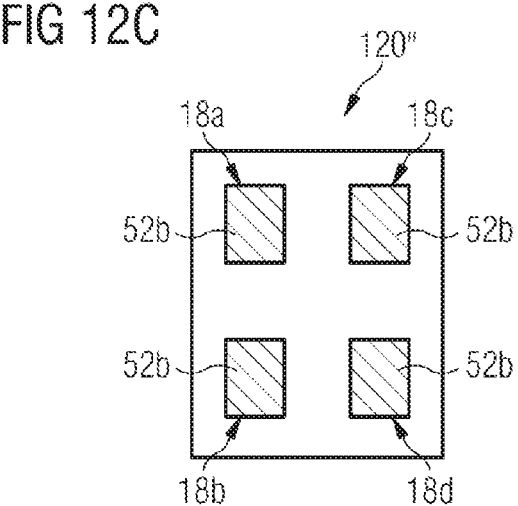
FIG. 12c shows a schematic plan view of a fluid sensor in which the turbostratic graphite is functionalized with a second material, according to an exemplary embodiment.

FIG. 12c shows a schematic plan view of a fluid sensor 120", in which the turbostratic graphite is functionalized by a material 52b, for example a metal oxide. The turbostratic graphite can have a functionalization on the basis of a combination with nanoparticles, for example platinum, palladium or any other metal or metal oxide arranged in a distributed fashion on an atomic level, for example. By way of example, metal oxides are zinc oxide, gallium oxide or the like, with conductive polymers or polythiophenes also being usable. Suitable materials may comprise materials such as nickel oxides ($NiO_2$) and/or copper oxide (CuO). The fluid or gas can arrange itself at grain boundaries of the sensor material and thus provide the contact with the sensor material 12. If a sensitivity to moisture or hydrogen is desired, there can be a functionalization with platinum or palladium as well, which, as nanoparticles, are arranged with a uniform distribution at an atomic level.

The evaluation principles of the fluid sensors described in the present case can be combined with the principle of functionalizing the sensor layer 12. The different functionalizations may represent a filter for certain molecule dimensions, for example. Examples of VOCs are alcohols or aromatic compounds, which can be distinguished on the basis of the diffusion constant.

Expressed differently, FIGS. 12a to 12c show examples of a technical implementation of exemplary embodiments in which a suitable material, such as turbostratic nanocrystalline graphite, for instance, which has a significant chemical robustness in relation to many fluids and gases, is arranged. Various thicknesses $d_1$ to $d_4$ and various functionalizations facilitate a large bandwidth of detectable fluids. This facilitates a distinction of gases with identical chemical properties, such as volatile organic compounds (VOCs), for instance, on the basis of their different diffusion constants.

Expressed differently, the basic functionality of each described exemplary embodiment can be described as follows: a concentration of two gases can be increased over time, as described in conjunction with FIGS. 8a to 8e, for example. The corresponding response of an infinitely thin sensor, which has no diffusion effects, is illustrated in FIGS. 8b and 8d. FIG. 8e shows the effect of the measurement with a single film: a change in resistance can be caused by a certain concentration of one gas or a different concentration of another gas. According to exemplary embodiments, use is made of another parameter, for instance the mass of the gas molecule or the like. By way of example, exemplary embodiments use the diffusion constant. As shown on the basis of FIGS. 9a to 9d, it is possible for a thicker sensor layer to bring about a different resistance response. The gas with the higher diffusion constant can saturate the thicker sensor layer more quickly, with this information item facilitating a distinction between the gases.

FIG. 13 shows a schematic side sectional view of a fluid sensor 130, in which a fluid sensor, for instance the fluid sensor 10 and/or any other fluid sensor, is arranged in a housing 54. The housing 54 comprises a controllable opening 56, which is configured to close the housing 54 or to open the latter for the fluid 16. This means that, in a closed state, an interior of the housing 54 can be uninfluenced by a change in the fluid 16 outside of the housing. Alternatively, or additionally, other fluid sensors according to exemplary embodiments may be arranged in the housing 54. By way of example, the evaluation device 44 may be embodied to control the controllable opening 56 in the closed state during a rest interval of the fluid sensor, in order to separate the sensor material of the fluid sensor 10 from the fluid 16 and, according to an embodiment, heating of the sensor material 12 may occur in this state in order to carry out a reset. The evaluation device may be embodied to control the controllable opening 56 in the open state in a second interval, for instance a measurement interval, in order to expose the sensor material to the fluid 16.

FIG. 14 shows a schematic block diagram of a gas sensor 140 according to an exemplary embodiment. The gas sensor 140 comprises a first sensor layer 58a with a first layer thickness $d_1$, said first sensor layer being arranged between a first electrode pair comprising electrodes 32a and 32b. The sensor layer 58a is embodied to provide, on the basis of a gas material 62, a first temporal change of a resistance value of the sensor layer 58a between the electrode pair 32a/32b on the basis of the contact of the sensor layer 58a with the gas material 62. The sensor layer 58a may comprise the sensor material 12 and the gas material 62 may be a gaseous version of the fluid 16.

The gas sensor 140 further comprises a second sensor layer 58b with a second layer thickness $d_2$, said second sensor layer being arranged between a second electrode pair comprising electrodes 32c and 32d and being embodied to provide, on the basis of the gas material 62, a second temporal change of the resistance value of the second sensor layer 58b between the electrode pair 32c/32d. The gas sensor 140 further comprises the evaluation device 44 that is embodied to provide the evaluation signal 45 on the basis of the first temporal change in the sensor layer 58a and the second temporal change in the sensor layer 58b, said evaluation signal indicating an information item in respect of a constituent of the gas material.

In respect of the configuration of the gas sensor 140, explanations made above can be used without limitations for the configuration of the gas sensor 140. Thus, the sensor layer 58a and the sensor layer 58b may be arranged, for example, laterally next to one another or else in a stack. Alternatively, or additionally, a functionalization of the sensor material 12 may be arranged, at least one further sensor layer with a further layer thickness may be arranged, a temperature-changing element may be arranged or an electrode configuration explained in conjunction with FIGS. 4a to 4d may be used.

FIG. 15 shows a schematic flowchart of a method 1500 for providing a fluid sensor according to an exemplary embodiment. The method 1500 comprises a step 1510, in which a sensor material is provided such that the latter is configured to come into contact at a surface region of same with a fluid, to obtain a first temporal change of a resistance value of the sensor material on the basis of the contact in a first sensor configuration, and to obtain a second temporal change of the resistance value of the sensor material on the basis of the contact in a second sensor configuration. In a step 1520, there is arranging of an output element such that a sensor signal is providable on the basis of the first and second temporal change of the resistance value.

The method 1500 can be used to provide a fluid sensor according to exemplary embodiments. Alternatively, or additionally, the method 150 can also be used to provide the gas sensor 140, for instance by virtue of the sensor material being provided in such a way that the temporal change of the resistance value is effectuated on the basis of the contact with the gas material 62 and by virtue of, further, the evaluation device 44 being connected to the sensor layers 58a and 58b.

FIG. 16 shows a schematic flowchart of a method 1600 for determining a constituent of a fluid, for instance of the fluid 16 or of the gas material 62. In a step 1610, there is contacting of the fluid with a sensor material, for instance the sensor material 12. In a step 1620, there is capturing of a first time curve of a resistance value of the sensor material in a first sensor configuration. In a step 1630, there is capturing of a second time curve of the resistance value of the sensor material in a second sensor configuration. In a step 1640, there is evaluating of the first and second time curve of the resistance value. In a step 1650, there is providing of an information item about a concentration of the constituent in the fluid. By way of example, the constituent can be a main constituent of the fluid.

Figure 17:
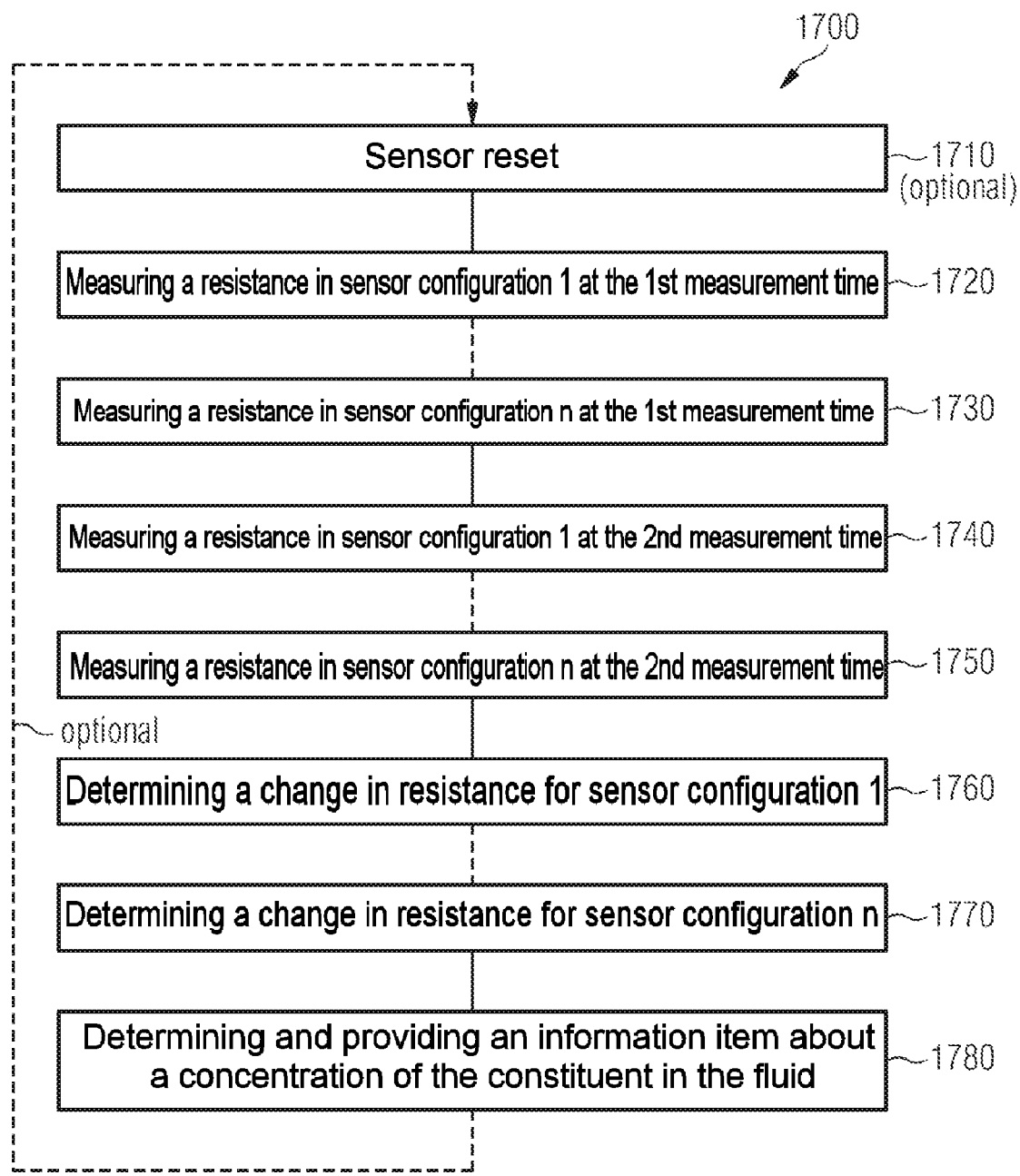
FIG. 17 shows a schematic flowchart of a further method for determining a constituent of a fluid according to a further exemplary embodiment.

FIG. 17 shows a schematic flowchart of a method 1700 for determining a constituent of a fluid that can be carried out as an alternative or in addition to the method 1600. In a step 1710, there optionally is a sensor reset, for example by heating sensor materials. In a step 1720, there is a resistance measurement of a first sensor configuration at a first measurement time. In a step 1730, there is a resistance measurement of a further, n-th sensor configuration at the first measurement time. The n-th sensor configuration can be the second sensor configuration or a higher valued sensor configuration, for example a fourth sensor configuration, if the fluid sensor or gas sensor has four sensor configurations. In a simplified manner, a resistance measurement is carried out for each of the sensor configurations at the first measurement time in steps 1720 to 1730. The first measurement time can be the same time or the same measurement interval, for example if the different sensor configurations are implemented by different layer thicknesses. Alternatively, the first measurement time for different sensor configurations may also be a comparable time interval, said time intervals being spaced apart in time, for instance if there is a temperature change between the sensor configurations.

In steps 1740 and 1750, there can be a resistance measurement in the sensor configurations used for steps 1720 and 1730 at a second measurement time, with the explanations in respect of the steps 1720 and 1730 relating to the correspondence of the measurement times applying.

In a step 1760, there is determining of a change in resistance for the first sensor configuration. In the step 1770, there is determining of a change in resistance for the n-th sensor configuration; i.e., the change in resistance between the first and the second measurement time is determined for the sensor configurations for which the resistance measurement is carried out in steps 1720 to 1750, wherein there may be a correlation of the change in resistance to the factor time (t).

In a step 1780, there is determining and providing of an information item about a concentration of a constituent in the fluid on the basis of the determined changes in resistance, as described in conjunction with the functionalities of the evaluation device 44. For a new measurement, there can be a switch from the step 1780 to the optional step 1710 or the step 1720.

In contrast to known materials which are used as sensitive layers for moisture and gas sensors, for instance metal oxides, polymers or dielectrics for capacitive measurements, salts or conductive polymers for resistance measurements, exemplary embodiments are able to distinguish different types of fluids or fluid constituents. While known sensor materials need to be adapted to certain gases, which is a complex undertaking, the selection between gases in the present case can be effectuated by the evaluation of the different changes in resistance. Exemplary embodiments use an easy-to-realize resistance measurement, and so it is possible to avoid a complicated measurement of capacitances.

Exemplary embodiments can be arranged in gas sensors, in particular mobile gas sensors, for instance in cellular telephones, automobiles or buildings. Exemplary embodiments facilitate the provision of a multi-gas sensor or multi-fluid sensor, which captures the diffusion constants of different fluids or gases in order to separate these. Exemplary embodiments may have a small or no aging effect in comparison with metal oxide functionalizations. It is possible to use functionalizations and diffusion constants on the same chip, as described in conjunction with FIGS. 12a-c.

According to a first aspect, a fluid sensor can comprise a sensor material configured to come into contact at a surface region of same with a fluid and to obtain a first temporal change of a resistance value of the sensor material on the basis of the contact in a first sensor configuration; and to obtain a second temporal change of the resistance value of the sensor material on the basis of the contact in a second sensor configuration; and can have an output element configured to provide a sensor signal on the basis of the first and second temporal change of the resistance value.

According to a second aspect with reference to the first aspect, the first temporal change and the second temporal change can be based on a first and a second constituent of the fluid.

According to a third aspect with reference to the first aspect, the fluid sensor can comprise a first sensor region that has the first sensor configuration and said fluid sensor can comprise a second sensor region that has the second sensor configuration.

According to a fourth aspect with reference to the third aspect, the sensor material can have a first layer thickness in the first sensor region and a second layer thickness in the second sensor region.

According to a fifth aspect with reference to the third aspect, the first sensor region and the second sensor region can form a sensor region stack.

According to a sixth aspect with reference to the third aspect, the first sensor region and the second sensor region can be arranged with a lateral spacing from one another on a substrate.

According to a seventh aspect with reference to the first aspect, the sensor material can be embodied to provide a first diffusion constant for a constituent of the fluid in the first sensor configuration, said first diffusion constant providing the first temporal change of the resistance value, and to provide a second diffusion constant in the second sensor configuration, said second diffusion constant providing the second temporal change of the resistance value.

According to an eighth aspect with reference to the first aspect, the fluid sensor can further comprise a temperature-changing element embodied to heat or cool the sensor material, wherein the first sensor configuration comprises a first temperature of the sensor material and wherein the temperature-changing element is embodied to provide the second sensor configuration on the basis of a temperature change of the sensor material.

According to a ninth aspect with reference to the eighth aspect, the temperature-changing element can be arranged between a substrate material of the fluid sensor and the sensor material.

According to a tenth aspect with reference to the first aspect, the fluid sensor can further comprise a plurality of electrodes that are embodied to apply a first voltage in the sensor material during a first time interval in order to obtain the first sensor configuration in the sensor material and to apply a second voltage in the sensor material during a second time interval in order to obtain the second sensor configuration in the sensor material.

According to an eleventh aspect with reference to the first aspect, the fluid sensor can further comprise a plurality of electrodes that are embodied to apply a first voltage in a first sensor material region in order to obtain the first sensor configuration in the first sensor material region and to apply a second voltage in a second sensor material region in order to obtain the second sensor configuration in the second sensor material region.

According to a twelfth aspect with reference to the first aspect, the fluid sensor can further comprise a plurality of electrodes that are embodied to apply a first electric field in the sensor material during a first time interval in order to obtain the first sensor configuration in the sensor material and to apply a second electric field in the sensor material during a second time interval in order to obtain the second sensor configuration in the sensor material.

According to a thirteenth aspect with reference to the first aspect, the fluid sensor can further comprise a plurality of electrodes that are embodied to produce a first electric field in a first sensor material region in order to obtain the first sensor configuration in the first sensor material region and to produce a second electric field in a second sensor material region in order to obtain the second sensor configuration in the second sensor material region.

According to a fourteenth aspect with reference to the twelfth aspect, the first electric field or the second electric field can be an alternating electric field.

According to a fifteenth aspect with reference to the first aspect, the fluid sensor can further comprise a heating element embodied to provide heating of the sensor material, said heating being configured to reduce a portion of fluid material arranged in the sensor material.

According to a sixteenth aspect with reference to the fifteenth aspect, the heating element can be arranged between a substrate material of the fluid sensor and the sensor material.

According to a seventeenth aspect with reference to the first aspect, the sensor material can comprise turbostratic carbon material.

According to an eighteenth aspect with reference to the first aspect, the first sensor configuration and the second sensor configuration can be part of a multiplicity of sensor configurations, wherein the fluid sensor can be embodied to obtain a corresponding multiplicity of temporal changes of the resistance value of the sensor material on the basis of the contact; and wherein the output element can be configured to provide the sensor signal on the basis of the multiplicity of temporal changes of the resistance value.

According to a nineteenth aspect with reference to the first aspect, the fluid sensor can further comprise an evaluation device embodied to receive the sensor signal and to provide an evaluation signal on the basis of the first and second temporal change of the resistance value, said evaluation signal comprising an information item about a constituent of the fluid.

According to a twentieth aspect with reference to the nineteenth aspect, the information item about the constituent of the fluid can comprise an information item in respect of a concentration of the constituent in the fluid.

According to a twenty-first aspect with reference to the nineteenth aspect, the evaluation device can be embodied to determine the first temporal change of the resistance value for a first plurality of measurement intervals and to determine the second temporal change of the resistance value for a second plurality of measurement intervals and to ascertain an information item in respect of the constituent of the fluid on the basis of changes in resistance in the first and second measurement intervals.

According to a twenty-second aspect with reference to the nineteenth aspect, the evaluation device can be embodied to actuate a heating element of the fluid sensor in order to obtain heating of the sensor material during a first time interval, said heating being configured to reduce a portion of fluid material arranged in the sensor material, and the evaluation device can be further configured to provide the evaluation signal in a second time interval that follows the first measurement interval in time.

According to a twenty-third aspect with reference to the nineteenth aspect, the evaluation device can be embodied to determine a first fitting function, said first fitting function approximating the first time curve, and to determine a second fitting function, said second fitting function approximating the second time curve, in order to compare the first fitting function and the second fitting function to a group of comparison functions that are associated with a group of fluid constituents so as to obtain a comparison result, and to provide the evaluation signal on the basis of the comparison result in such a way that it specifies an information item in respect of the constituent of the fluid.

According to a twenty-fourth aspect with reference to the nineteenth aspect, the fluid sensor can have a plurality of sensor configurations and the evaluation device can be embodied to provide the evaluation signal in such a way that it has an information item in respect of a plurality of constituents of the fluid that correspond to the plurality of sensor configurations.

According to a twenty-fifth aspect with reference to the nineteenth aspect, the fluid sensor can further comprise a housing that houses the sensor material, wherein the housing can have a controllable opening, wherein the evaluation device can be embodied to control the controllable opening during a rest interval into a first state in which the controllable opening is closed in order to separate the sensor material from the fluid and to control the controllable opening during a measurement interval into a second state in which the controllable opening is opened in order to expose the sensor material to the fluid.

According to a twenty-sixth aspect with reference to the nineteenth aspect, the evaluation device can be embodied to evaluate the fluid in respect of the constituent over an observation time period and, should the concentration of the constituent in the fluid remain unchanged over the observation time period, to output the evaluation signal in such a way that it has an information item about the unchanged concentration.

According to a twenty-seventh aspect, a gas sensor can comprise the following features: a first sensor layer with a first layer thickness, said first sensor layer being arranged between a first electrode pair and being embodied to provide, on the basis of a gas material, a first temporal change of a resistance value of the first sensor layer between the first electrode pair on the basis of a contact with the gas material; a second sensor layer with a second layer thickness, said second sensor layer being arranged between a second electrode pair and being embodied to provide, on the basis of the gas material, a second temporal change of the resistance value of the second sensor layer between the second electrode pair; and an evaluation device embodied to provide an evaluation signal on the basis of the first temporal change and the second temporal change, said evaluation signal indicating an information item in respect of a constituent of the gas material.

According to a twenty-eighth aspect, a method for providing a fluid sensor can include the following steps: providing a sensor material such that the latter is configured to come into contact at a surface region of same with a fluid, to obtain a first temporal change of a resistance value of the sensor material on the basis of the contact in a first sensor configuration; and to obtain a second temporal change of the resistance value of the sensor material on the basis of the contact in a second sensor configuration; and arranging an output element such that a sensor signal is providable on the basis of the first and second temporal change of the resistance value.

According to a twenty-ninth aspect, a method for determining a constituent of a fluid can include the following steps: contacting the fluid with a sensor material; capturing a first time curve of a resistance value of the sensor material in a first sensor configuration; capturing a second time curve of the resistance value of the sensor material in a second sensor configuration; evaluating the first and second time curve of the resistance value; and providing an information item about a concentration of the constituent in the fluid.

Even though some aspects were described in conjunction with an apparatus, it is understood that these aspects also represent a description of the corresponding method, and so a block or a component of an apparatus should also be understood to be a corresponding method step or a feature of a method step. Analogously thereto, aspects that were described in conjunction with or as a method step also represent a description of a corresponding block or detail or feature of a corresponding apparatus.

The above-described exemplary embodiments merely represent an illustration of the principles of the present invention. It is understood that modifications and variations of the described arrangements and details will be apparent to other persons skilled in the art. Therefore, it is intended that the invention be restricted only by the scope of protection of the patent claims below and not by the specific details presented on the basis of the description and the explanation of the exemplary embodiments.

What is claimed is:

1. A fluid sensor having:
   a sensor material comprising a surface region, wherein the surface region is configured to come into contact with a fluid, the sensor material is configured to obtain a first temporal change of a resistance value based on contacting the fluid in a first sensor configuration, and the sensor material is configured to obtain a second temporal change of the resistance value based on contacting the fluid in a second sensor configuration; and
   an output element configured to provide a sensor signal on the basis of the first and second temporal change of the resistance value.

2. The fluid sensor as claimed in claim 1, wherein the first temporal change and the second temporal change are based on a first and a second constituent of the fluid.

3. The fluid sensor as claimed in claim 1, further comprising a first sensor region that has the first sensor configuration and comprising a second sensor region that has the second sensor configuration.

4. The fluid sensor as claimed in claim 3, wherein the sensor material has a first layer thickness in the first sensor region and a second layer thickness different from the first layer thickness in the second sensor region.

5. The fluid sensor as claimed in claim 3, wherein the first sensor region and the second sensor region form a sensor region stack.

6. The fluid sensor as claimed in claim 3, wherein the first sensor region and the second sensor region are arranged with a lateral spacing from one another.

7. The fluid sensor as claimed in claim 1, wherein the sensor material is configured to provide a first diffusion constant for a constituent of the fluid in the first sensor configuration, said first diffusion constant providing the first temporal change of the resistance value, and to provide a second diffusion constant in the second sensor configuration, said second diffusion constant providing the second temporal change of the resistance value.

8. The fluid sensor as claimed in claim 1, further comprising a temperature-changing element configured to heat or cool the sensor material, wherein the first sensor configuration comprises a first temperature of the sensor material, and wherein the temperature-changing element is configured to provide the second sensor configuration on the basis of a temperature change of the sensor material.

9. The fluid sensor as claimed in claim 8, wherein the temperature-changing element is arranged between a substrate material of the fluid sensor and the sensor material.

10. The fluid sensor as claimed in claim 1, further comprising a plurality of electrodes that are configured to apply a first voltage in the sensor material during a first time interval in order to obtain the first sensor configuration in the sensor material, and are configured to apply a second voltage in the sensor material during a second time interval in order to obtain the second sensor configuration in the sensor material.

11. The fluid sensor as claimed in claim 1, further comprising a plurality of electrodes that are configured to apply a first voltage in a first sensor material region in order to obtain the first sensor configuration in the first sensor material region, and configured to apply a second voltage in a second sensor material region in order to obtain the second sensor configuration in the second sensor material region.

12. The fluid sensor as claimed in claim 1, further comprising a plurality of electrodes that are configured to apply a first electric field in the sensor material during a first time interval in order to obtain the first sensor configuration in the sensor material, and configured to apply a second electric field or no electric field in the sensor material during a second time interval in order to obtain the second sensor configuration in the sensor material.

13. The fluid sensor as claimed in claim 1, further comprising a plurality of electrodes that are configured to produce a first electric field in a first sensor material region in order to obtain the first sensor configuration in the first sensor material region, and configured to produce a second electric field or no electric field in a second sensor material region in order to obtain the second sensor configuration in the second sensor material region.

14. The fluid sensor as claimed in claim 13, wherein the first electric field or the second electric field is an alternating electric field.

15. The fluid sensor as claimed in claim 1, further comprising a heating element configured to provide heating of the sensor material, said heating being configured to reduce a portion of fluid material arranged in the sensor material.

16. The fluid sensor as claimed in claim 15, wherein the heating element is arranged between a substrate material of the fluid sensor and the sensor material.

17. The fluid sensor of claim 15, wherein the heating element comprises an ohmic heating element or a Peltier element.

18. The fluid sensor as claimed in claim 1, wherein the sensor material comprises turbostratic carbon material.

19. The fluid sensor as claimed in claim 1, wherein the first sensor configuration and the second sensor configuration are part of a multiplicity of sensor configurations, wherein the fluid sensor is embodied to obtain a corresponding multiplicity of temporal changes of the resistance value of the sensor material on the basis of the contact, and wherein the output element is configured to provide the sensor signal on the basis of the multiplicity of temporal changes of the resistance value.

20. The fluid sensor as claimed in any claim 1, further comprising an evaluation device configured to receive the sensor signal and to provide an evaluation signal on the basis of the first and second temporal change of the resistance value, said evaluation signal comprising an information item about a constituent of the fluid.

21. The fluid sensor as claimed in claim 20, wherein the information item about the constituent of the fluid comprises an information item in respect of a concentration of the constituent in the fluid.

22. The fluid sensor as claimed in claim 20, wherein the evaluation device is configured to determine the first temporal change of the resistance value for a first plurality of measurement intervals and to determine the second temporal change of the resistance value for a second plurality of measurement intervals and to ascertain an information item in respect of the constituent of the fluid on the basis of changes in resistance in the first and second measurement intervals.

23. The fluid sensor as claimed in claim 22, wherein the evaluation device is configured to actuate a heating element of the fluid sensor in order to obtain heating of the sensor material during a first time interval, said heating being configured to reduce a portion of fluid material arranged in the sensor material, and wherein the evaluation device is further configured to provide the evaluation signal in a second time interval that follows the first measurement interval in time.

24. The fluid sensor as claimed in claim 20, wherein the evaluation device is configured to determine a first fitting function, said first fitting function approximating a first time curve, and configured to determine a second fitting function, said second fitting function approximating a second time curve, in order to compare the first fitting function and the second fitting function to a group of comparison functions that are associated with a group of fluid constituents so as to obtain a comparison result, and to provide the evaluation signal on the basis of the comparison result in such a way that it specifies an information item in respect of the constituent of the fluid.

25. The fluid sensor as claimed in claim 20, having a plurality of sensor configurations, wherein the evaluation device is configured to provide the evaluation signal in such a way that it has an information item in respect of a plurality of constituents of the fluid that correspond to the plurality of sensor configurations.

26. The fluid sensor as claimed in claim 20, further comprising a housing that houses the sensor material, wherein the housing has a controllable opening, wherein the evaluation device is configured to control the controllable opening during a rest interval into a first state in which the controllable opening is closed in order to separate the sensor material from the fluid and to control the controllable opening during a measurement interval into a second state in which the controllable opening is opened in order to expose the sensor material to the fluid.

27. The fluid sensor as claimed in claim 21, wherein the evaluation device is configured to evaluate the fluid in respect of the constituent over an observation time period and, if the concentration of the constituent in the fluid remains unchanged over the observation time period, to output the evaluation signal to have an information item about the unchanged concentration.

28. A gas sensor comprising:
a first sensor layer with a first layer thickness, said first sensor layer being arranged between a first electrode pair and being embodied to provide, on the basis of a gas material, a first temporal change of a resistance value of the first sensor layer between the first electrode pair based on the first sensor layer contacting the gas material;
a second sensor layer with a second layer thickness different from the first layer thickness, said second sensor layer being arranged between a second electrode pair and being embodied to provide second temporal change of the resistance value of the second sensor layer between the second electrode pair based on the second sensor layer contacting the gas material; and
an evaluation device embodied to provide an evaluation signal on the basis of the first temporal change and the second temporal change, said evaluation signal indicating an information item in respect of a constituent of the gas material.

29. A method for providing a fluid sensor, the method comprising:
providing a sensor material comprising a surface region, wherein the surface region is configured to come in contact with a fluid, the sensor material is configured to obtain a first temporal change of a resistance value based on contacting the fluid in a first sensor configuration, and the sensor material is configured to obtain a second temporal change of the resistance value based on contacting the fluid in a second sensor configuration; and
arranging an output element such that a sensor signal is providable on the basis of the first and second temporal change of the resistance value.

30. A method for determining a constituent of a fluid, including the following steps:
contacting the fluid with a sensor material;
capturing a first time curve of a resistance value of the sensor material in a first sensor configuration based on contacting the fluid with the sensor material;
capturing a second time curve of the resistance value of the sensor material in a second sensor configuration based on contacting the fluid with the sensor material;
evaluating the first and second time curve of the resistance value; and
providing an information item about a concentration of the constituent in the fluid based on evaluating the first and second time curve of the resistance value.

* * * * *